US012674080B2

(12) United States Patent (10) Patent No.: US 12,674,080 B2

Tanii et al. (45) Date of Patent: Jul. 7, 2026

(54) ADHESIVE SHEET, ARTICLE AND METHOD FOR PRODUCING ARTICLE

(71) Applicant: DIC Corporation, Tokyo (JP)

(72) Inventors: Shota Tanii, Saitama (JP); Akinori Morino, Chiba (JP); Sumio Shimooka, Saitama (JP)

(73) Assignee: DIC Corporation, Tokyo (JP)

( * ) Notice: Subject to any disclaimer, the term of this patent is extended or adjusted under 35 U.S.C. 154(b) by 290 days.

(21) Appl. No.: 18/327,235

(22) Filed: Jun. 1, 2023

(65) Prior Publication Data

US 2023/0312988 A1      Oct. 5, 2023

Related U.S. Application Data

(63) Continuation of application No. PCT/JP2021/045257, filed on Dec. 9, 2021.

(30) Foreign Application Priority Data

Dec. 15, 2020    (JP) ................................. 2020-207418

(51) Int. Cl.
*C09J 7/35* (2018.01)

(52) U.S. Cl.
CPC ......... *C09J 7/35* (2018.01); *C09J 2301/1242* (2020.08); *C09J 2301/312* (2020.08); *C09J 2301/50* (2020.08)

(58) Field of Classification Search
CPC ......... C09J 7/35; C09J 5/08; C09J 7/10; C09J 201/00; C09J 5/06; C09J 2301/1242;
(Continued)

(56) References Cited

U.S. PATENT DOCUMENTS

| | | | | |
|---|---|---|---|---|
| 2019/0144718 A1* | 5/2019 | Aizawa | .................. | B60J 5/0469 |
| | | | | 428/317.5 |
| 2021/0309889 A1* | 10/2021 | Ueno | ......................... | C08J 9/32 |
| 2023/0146040 A1* | 5/2023 | Shimada | ................... | C09J 7/50 |
| | | | | 428/327 |

FOREIGN PATENT DOCUMENTS

| | | | |
|---|---|---|---|
| JP | 2010150297 A | * | 7/2010 |
| JP | 2017-52950 A | | 3/2017 |

(Continued)

OTHER PUBLICATIONS

Machine Translation of JP 2010-150297A (Year: 2025).*

*Primary Examiner* — Scott R. Walshon

(74) *Attorney, Agent, or Firm* — Osha Bergman Watanabe & Burton LLP

(57) ABSTRACT

An adhesive sheet includes a first face and a second face opposite to each other. The first face includes a thermally expandable thermosetting adhesive layer A, and the second face includes a thermally expandable thermosetting adhesive layer B having a different composition from that of the thermally expandable thermosetting adhesive layer A. The thermally expandable thermosetting adhesive layer B is laminated on one face of the thermally expandable thermosetting adhesive layer A directly or through another layer. The first face has a higher shear adhesive strength than a shear adhesive strength of the second face. The thermally expandable thermosetting adhesive layer A and the thermally expandable thermosetting adhesive layer B each have a thickness direction expansion rate after heating at 150° C. for 60 minutes of 130% or more.

11 Claims, 4 Drawing Sheets

(58) Field of Classification Search
CPC .............. C09J 2301/312; C09J 2301/50; C09J
2301/208; C09J 2301/408; C09J
2301/412; C08K 9/10
See application file for complete search history.

(56) References Cited

FOREIGN PATENT DOCUMENTS

| | | |
|---|---|---|
| JP | 2017-203117 A | 11/2017 |
| JP | 2019-182977 A | 10/2019 |

* cited by examiner

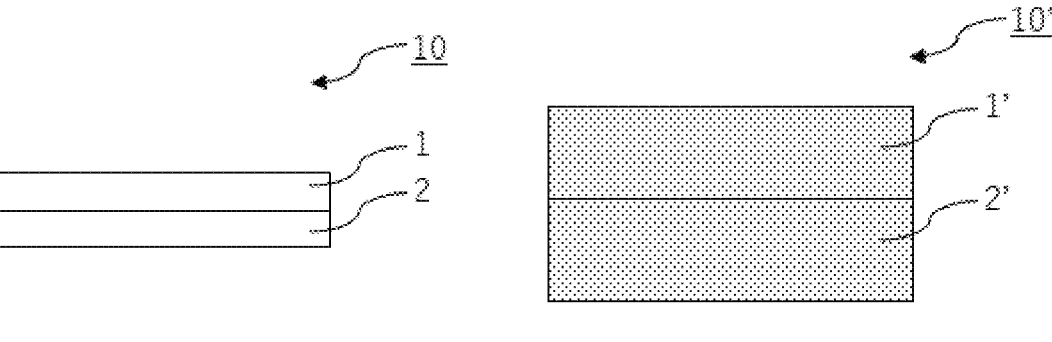
FIG. 1A                    FIG. 1B
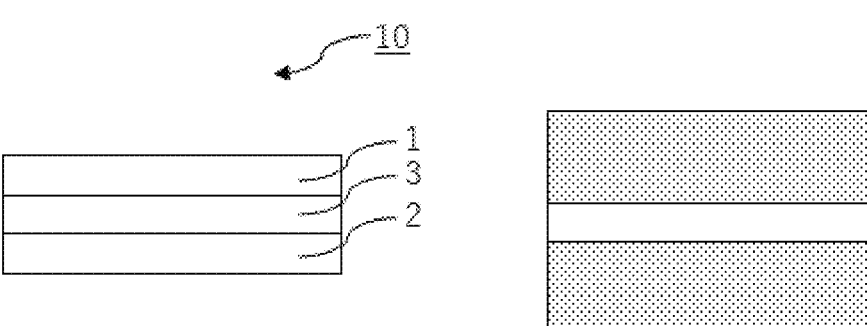
FIG. 2A                    FIG. 2B

ADHESIVE SHEET, ARTICLE AND METHOD FOR PRODUCING ARTICLE

TECHNICAL FIELD

One or more embodiments of the present invention relate to an adhesive sheet having an adhesive layer expandable by heating.

BACKGROUND

Methods of fixing in which one member is inserted into a cavity formed in another member or a cavity formed between two or more other members to be fixed are being used in production situations for various products such as automobiles and electric equipment. In motors installed in hybrid cars and the like, for example, a magnet is inserted into and fixed to a cavity provided in a certain position of a core part (a rotor core). A member to be inserted into a cavity is referred to as a member to be inserted, while a member formed with a cavity or a set of two or more members forming a cavity is referred to as an inserted member.

In the above method of fixing, to prevent the member inserted into the cavity from falling, the member to be inserted is usually inserted into the cavity of the inserted member, and then the cavity is filled with liquid adhesive to bond the member to be inserted and the inserted member together. However, this method may cause positional deviation of the member to be inserted in the cavity or cause the member to fall out of the cavity before the adhesive cures. In addition, the viscosity and the filling amount of the liquid adhesive are required to be adjusted, thus making the process complicated, and the process time may be prolonged. Furthermore, in the above method, the adhesive adheres outside the cavity of the member, causing contamination.

Given these circumstances, in recent years, methods of bonding the member to be inserted and the inserted member using an adhesive sheet instead of the liquid adhesive have been considered, and among them, being studied is a method of disposing an adhesive sheet having expandability in a cavity of the inserted member together with the member to be inserted and expanding the adhesive sheet to fill the cavity and to bond the member to be inserted and the inserted member together.

PTL 1, for example, discloses an adhesive sheet having an adhesive layer (B) on one face of an adhesive layer (A) directly or through another layer, in which the thickness direction expansion rate of the adhesive layer (A) is a certain value or more and the thickness direction expansion rate of the adhesive layer (B) is a certain value or less after being left under a 130° C. environment for 1 hour.

PTL 2 discloses an adhesive sheet having a pressure-sensitive adhesive layer (B) on one face of an expandable adhesive layer (A) directly or through another layer, in which the thickness of the pressure-sensitive adhesive layer (B) is within a certain range, and its 180-degree peeling adhesive strength at room temperature (23° C.) is a certain value or more.

PATENT LITERATURE

PTL 1: Japanese Unexamined Patent Application No. 2017-052950
PTL 2: Japanese Unexamined Patent Application No. 2019-182977

The adhesive sheet for use in bonding between the member to be inserted and the inserted member are required to allow a member as the member to be inserted to be inserted into a cavity of a member as the inserted member before bonding the members together by heat expansion. Thus, the adhesive sheet at room temperature before insertion is required to have low or no initial adhesiveness so as not to interfere with the insertability of the member. After insertion, on the other hand, the member to be inserted and the inserted member cannot be immediately bonded together, and thus the adhesive sheet at room temperature is required to have high initial adhesiveness to enable temporary fixation so that the adhesive sheet does not deviate from a designated position before the adhesive sheet is expanded to bond and fix the members together. Furthermore, high heat resistance is required for bonding members becoming high temperatures, such as motors for automobiles, and thus the adhesive sheet is required to develop excellent adhesive strength to enable the member to be inserted and the inserted member to be firmly bonded together even under high temperature environments in addition to room temperature and to have heat resistance.

However, when the cavity is attempted to be filled by heating and expanding a single-layer thermally expandable adhesive layer as in the adhesive sheet disclosed in PTL 1, the adhesive strength of the adhesive layer decreases as the expansion rate is increased, and sufficient adhesive strength cannot be developed under room temperature and high temperature environments.

When a thermoplastic pressure-sensitive adhesive layer (B) is provided on one face to impart temporary fixability as in the adhesive sheet disclosed in PTL 2, it has poor heat resistance and cannot develop sufficient adhesive strength under high temperature environments, making it unsuitable for bonding members becoming high temperatures together.

SUMMARY

One or more embodiments of the present invention have been made in view of the above circumstances and provide an adhesive sheet expandable by heating, the adhesive sheet, before expansion, achieving both temporary fixability at room temperature and ease of insertion when inserting one member into a cavity of another member and, after expansion, capable of sufficiently filling the cavity and maintaining excellent adhesive strength to enable the members to be firmly bonded together even under high temperature environments, an article including the adhesive sheet, and a method for producing the same.

First, one or more embodiments of the present invention provide an adhesive sheet including a first face and a second face opposite to each other, the first face including a thermally expandable thermosetting adhesive layer A containing a thermosetting resin and an expansion agent, the second face including a thermally expandable thermosetting adhesive layer B containing a thermosetting resin and an expansion agent and having a different composition from a composition of the thermally expandable thermosetting adhesive layer A, the thermally expandable thermosetting adhesive layer B being laminated on one face of the thermally expandable thermosetting adhesive layer A directly or through another layer, the first face having a higher shear adhesive strength than a shear adhesive strength of the second face, and the thermally expandable thermosetting adhesive layer A and the thermally expandable thermosetting adhesive layer B each having a thickness direction expansion rate after heating at 150° C. for 60 minutes of 130% or more.

Second, one or more embodiments of the present invention provide an article including a first adherend and a second adherend, the second adherend being formed with a cavity, the first adherend being disposed in the cavity of the second adherend, an expanded product of the adhesive sheet being disposed between the first adherend and the second adherend in the cavity, and one of the first adherend and the second adherend being bonded to an expanded product of the thermally expandable thermosetting adhesive layer A and another of the first adherend and the second adherend being bonded to an expanded product of the thermally expandable thermosetting adhesive layer B.

One or more embodiments of the present invention provide an article including a first adherend, a third adherend, and a fourth adherend and having a cavity between the third adherend and the fourth adherend, the first adherend being disposed in the cavity, an expanded product of the adhesive sheet being disposed between the first adherend and the third adherend and between the first adherend and the fourth adherend each in the cavity, and at least one of the first adherend, and the third adherend and the fourth adherend being bonded to an expanded product of the thermally expandable thermosetting adhesive layer A and another of the first adherend, and the third adherend and the fourth adherend being bonded to an expanded product of the thermally expandable thermosetting adhesive layer B.

Third, one or more embodiments of the present invention provide a method for producing an article, the method including a step [1A] of bonding a face of the adhesive sheet on the thermally expandable thermosetting adhesive layer A side to a surface of a first adherend or a surface of a cavity formed in a second adherend, a step [2A] of inserting the first adherend into the cavity, and a step [3A] of heating the adhesive sheet to expand and cure the thermally expandable thermosetting adhesive layer A and the thermally expandable thermosetting adhesive layer B and to bond the first adherend and the second adherend together through an expanded product of the adhesive sheet.

One or more embodiments of the present invention provide a method for producing an article, the method including a step [1B] of bonding a face of the adhesive sheet on the thermally expandable thermosetting adhesive layer A side to a surface of a first adherend or a surface of a cavity formed by a third adherend and a fourth adherend, a step [2B] of inserting the first adherend into the cavity, and a step [3B] of heating the adhesive sheet to expand and cure the thermally expandable thermosetting adhesive layer A and the thermally expandable thermosetting adhesive layer B and to bond the first adherend, and the third adherend and the fourth adherend together through an expanded product of the adhesive sheet.

The adhesive sheet of one or more embodiments of the present invention has the first face including the thermally expandable thermosetting adhesive layer A showing a certain expansion rate by heating and the second face including the thermally expandable thermosetting adhesive layer B showing a certain expansion rate by heating, in which the first face and the second face have different shear adhesive strengths, and can thereby, before expansion, achieve both temporal fixability enabling fixation to a member under room temperature and ease of insertion when one member is inserted into a cavity of another member and, after expansion, sufficiently fill the cavity to maintain excellent adhesive strength and to firmly bond the members together even under high temperature environments.

BRIEF DESCRIPTION OF THE DRAWINGS

FIGS. 1A-1B are schematic sectional views of an example of an adhesive sheet of one or more embodiments of the present invention respectively.

FIGS. 2A-2B are schematic sectional views of an example of the adhesive sheet of one or more embodiments of the present invention respectively.

DETAILED DESCRIPTION

I. Adhesive Sheet

Figure 3A:
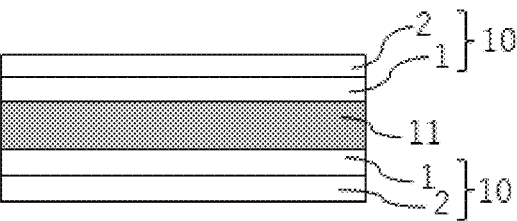
FIGS. 3A-3C are procedure diagrams of an example of a method for producing an article of one or more embodiments of the present invention.

The adhesive sheet of one or more embodiments of the present invention has a first face and a second face opposite to each other, the first face including a thermally expandable thermosetting adhesive layer A containing a thermosetting resin and an expansion agent, the second face including a thermally expandable thermosetting adhesive layer B containing a thermosetting resin and an expansion agent and having a different composition from that of the thermally expandable thermosetting adhesive layer A, the thermally expandable thermosetting adhesive layer B being laminated on one face of the thermally expandable thermosetting adhesive layer A directly or through another layer, the first face having a higher shear adhesive strength than a shear adhesive strength of the second face, and the thermally expandable thermosetting adhesive layer A and the thermally expandable thermosetting adhesive layer B each having a thickness direction expansion rate after heating at 150° C. for 60 minutes of 130% or more.

FIGS. 1A-1B and FIGS. 2A-2B are schematic sectional views of examples of an adhesive sheet of one or more embodiments of the present invention, in which FIG. 1A and FIG. 2A illustrate examples before heating, and FIG. 1B and FIG. 2B illustrate examples after heating, respectively. As illustrated in FIGS. 1A-1B and FIGS. 2A-2B, this adhesive sheet 10 of one or more embodiments of the present invention has the thermally expandable thermosetting adhesive layer A (the symbol 1 in FIG. 1A and FIG. 2A) forming the first face and the thermally expandable thermosetting adhesive layer B (the symbol 2 in FIG. 1A and FIG. 2A) forming the second face opposite to the first face. The thermally expandable thermosetting adhesive layers A and B each contain at least the thermosetting resin and the expansion agent, and the thermally expandable thermosetting adhesive layer B has a different composition from that of the thermally expandable thermosetting adhesive layer A.

The thermally expandable thermosetting adhesive layer B is laminated on one face of the thermally expandable thermosetting adhesive layer A directly or through another layer. The adhesive sheet 10 illustrated in FIG. 1A shows a mode in which the thermally expandable thermosetting adhesive layer A and the thermally expandable thermosetting adhesive layer B are directly laminated on each other, while the adhesive sheet 10 illustrated in FIG. 2A shows a mode in which they are laminated on each other through an intermediate layer (the symbol 3 in FIG. 2A) as the other layer between the thermally expandable thermosetting adhesive layer A and the thermally expandable thermosetting adhesive layer B.

The adhesive sheet 10 of one or more embodiments of the present invention is characterized in that shear adhesive strength of the first face is higher than the shear adhesive strength of the second face. The thermally expandable thermosetting adhesive layers A and B are each a layer expanding and curing by heating, and in an adhesive sheet 10' after expansion, the thermally expandable thermosetting adhesive layer A (the symbol 1' in FIG. 1B and FIG. 2B) and the thermally expandable thermosetting adhesive layer B (the symbol 2' in FIG. 1B and FIG. 2B) each have a thickness direction expansion rate of the thermally expandable thermosetting adhesive layer A and the thermally expandable thermosetting adhesive layer B after heating at 150° C. for 60 minutes of a certain value or more and can fill the space by heat expansion. The thermally expandable thermosetting adhesive layer A after expansion and the thermally expandable thermosetting adhesive layer B after expansion develop high adhesive strength even under high temperature environments.

The adhesive sheet of one or more embodiments of the present invention, in the production of an article in which a member to be inserted is fixed to a cavity of an inserted member, can be temporarily fixed to one member at room temperature on the first face including the thermally expandable thermosetting adhesive layer A and can, when inserting the member to be inserted into the cavity, prevent the insertion from being hindered by the adhesiveness of the surface of the adhesive sheet on the second face including the thermally expandable thermosetting adhesive layer B. In addition, the thermally expandable thermosetting adhesive layers A and B show an expansion rate of a certain value or more in a specific heating condition and thereby fill a gap created in the cavity after inserting the member to be inserted, and the thermally expandable thermosetting adhesive layer A after expansion and the thermally expandable thermosetting adhesive layer B after expansion develop adhesive strength through curing, and thus the member to be inserted and the inserted member can be firmly bonded together through the adhesive sheet after expansion, and high adhesive strength can be exhibited even under high temperature environments by heat curing.

The adhesive sheet of one or more embodiments of the present invention can produce the functions described above regardless of the size of the cavity. When a narrow cavity is filled with an expanded product of the adhesive sheet to be bonded, for example, with the first face of the adhesive sheet temporarily fixed to an adherend, the second face of the adhesive sheet is likely to come into contact with another member, and thus inhibition of insertion and positional deviation of the adhesive sheet are likely to occur. In contrast, in one or more embodiments of the present invention, the two principal faces, or the first face and the second face, which are opposite to each other, of the adhesive sheet have different adhesiveness, and thus even for a narrow cavity, the insertion of the member is not inhibited on the second face of the adhesive sheet, good insertability can be developed, and deviation of the bonding position of the adhesive sheet is less likely to occur. When a wide cavity is filled with the expanded product of the adhesive sheet to be bonded, it is necessary to increase the expansion rate of the thermally expandable thermosetting adhesive layer, but if the expansion rate of a single-layer thermally expandable thermosetting adhesive layer is too large, especially the adhesive strength under high temperature environments is likely to decrease. It is presumed that this is because the density in the thermally expandable thermosetting adhesive layer decreases due to expansion, which makes high-temperature degradation likely to occur and makes heat resistance likely to decrease. In contrast, one or more embodiments of the present invention have two thermally expandable thermosetting adhesive layers A and B showing an expansion rate of a certain value or more in a specific heating condition and expands and cures the adhesive layers A and B by heating, and thereby even a wide cavity can be sufficiently filled, and the members can be bonded together with high adhesive strength and can maintain the bonded state under high temperature environments.

In the adhesive sheet of one or more embodiments of the present invention, the shear adhesive strength of the first face is larger than the shear adhesive strength of the second face so that the first face can exhibit temporary fixability and the second face can exhibit insertability. Specifically, the difference between the shear adhesive strength of the first face of the adhesive sheet and the shear adhesive strength of the second face is preferably 0.01 MPa or more, further preferably 0.1 MPa or more, and more preferably 0.5 MPa or more. This is because the difference in shear adhesive strength between the first face and the second face of the adhesive sheet being within the above range enables the first face and the second face to sufficiently exhibit the respective functions described above, and the function exhibited by one face can be prevented from impairing the function exhibited by the other face. A larger difference between the shear adhesive strength of the first face of the adhesive sheet and the shear adhesive strength of the second face is more preferred, which is not limited to a particular value and can be 2 MPa or less, for example, and may be 1 MPa or less.

The first face of the adhesive sheet of one or more embodiments of the present invention is enough to have a shear adhesive strength capable of exhibiting temporary fixability and is set to be higher than the shear adhesive strength of the second face. The shear adhesive strength of the first face of the adhesive sheet is preferably 0.2 MPa or more, further preferably 0.5 MPa or more, and in view of the capability of exhibiting higher temporary fixability on the first face of the adhesive sheet, more preferably 1.0 MPa or more. A higher shear adhesive strength of the first face of the adhesive sheet is more preferred, with the upper limit of the shear adhesive strength not limited to a particular value, and the upper limit can be 2 MPa, for example, and may be 1 MPa. The shear adhesive strength of the first face of the adhesive sheet, which is mainly caused by the shear adhesive strength of the thermally expandable thermosetting adhesive layer A forming the first face, can be adjusted as appropriate in accordance with the layer configuration of the adhesive sheet and the like.

On the other hand, the second face of the adhesive sheet is enough to have a shear adhesive strength capable of exhibiting insertability and is set to be lower than the shear adhesive strength of the first face. The shear adhesive strength of the second face of the adhesive sheet is preferably less than 0.5 MPa, especially preferably 0.3 MPa or less, further preferably 0.2 MPa or less, and in view of preventing the occurrence of troubles such as sticking of the second face of the adhesive sheet of one or more embodiments of the present invention to a position different from a designated position and the capability of increasing the insertability when inserting the member to be inserted into the cavity, more preferably 0.1 MPa or less. A lower shear adhesive strength of the thermally expandable thermosetting adhesive layer B is more preferred because the initial adhesiveness disappears and the insertability when inserting the member to be inserted into the cavity improves, and the lower limit value is preferably 0 MPa and may be 0.01 MPa or more. The shear adhesive strength of the second face of the adhesive sheet, which is mainly caused by the shear adhesive strength of the thermally expandable thermosetting adhesive layer B forming the second face, can be adjusted in accordance with the layer configuration of the adhesive sheet and the like.

The shear adhesive strength of each face of the adhesive sheet can be measured by the following method in conformity with the tensile shear test described in JIS Z 1541. First, the adhesive sheet is cut into a size of 10 mm×10 mm, and one face out of a first face and a second face of the cut adhesive sheet (a face not to be measured) is fixed to the surface of one aluminum plate A out of two degreased, smooth-surfaced aluminum plates (15 mm wide×70 mm long×0.5 mm thick) with strong adhesive, while the other face of the adhesive sheet (a face to be measured) is joined with the surface of the other aluminum plate B, thereby holding the adhesive sheet between the two aluminum plates A and B, which are pressure bonded together at 23° C. for 10 seconds with a load of 0.5 MPa, which is a test piece. Next, the test piece is left under a 23° C. environment for 5 minutes, and then the ends of the two aluminum plates A and B are each chucked, and a tensile test is performed at 10 mm/minute in a 180° direction using a Tensilon tensile testing machine. The value obtained in this case can be defined as the shear adhesive strength of the face of the adhesive sheet on the aluminum B side (the face to be measured).

The face not to be measured of the adhesive sheet is strongly fixed to the aluminum plate A using the strong adhesive, thus not causing peeling on the face not to be measured side of the adhesive sheet in the tensile test, and measurement is possible as the shear adhesive strength of the face to be measured.

The first face and the second face of the adhesive sheet refer to one outermost face and the other outermost face of the adhesive sheet excluding a release liner. Unless otherwise specified, when described as "the adhesive sheet," "the thermally expandable thermosetting adhesive layer A," and "the thermally expandable thermosetting adhesive layer B," they mean "the adhesive sheet," "the thermally expandable thermosetting adhesive layer A," and "the thermally expandable thermosetting adhesive layer B" before expansion, respectively. Furthermore, "an expanded product of the adhesive sheet," "an expanded product of the thermally expandable thermosetting adhesive layer A," and "an expanded product of the thermally expandable thermosetting adhesive layer B" mean "the adhesive sheet after expansion," "the thermally expandable thermosetting adhesive layer A after expansion," and "the thermally expandable thermosetting adhesive layer B after expansion," respectively. "After expansion" refers to after expansion and curing of the thermally expandable thermosetting adhesive layer and refers to "after heating at 150° C. for 60 minutes" unless otherwise specified.

(1) Thermally Expandable Thermosetting Adhesive Layer A

The thermally expandable thermosetting adhesive layer A in one or more embodiments of the present invention is a layer containing at least a thermosetting resin and an expansion agent. The thermally expandable thermosetting adhesive layer A forms the first face of the adhesive sheet of one or more embodiments of the present invention excluding the release liner.

The thermally expandable thermosetting adhesive layer A has a higher shear adhesive strength than the shear adhesive strength of the thermally expandable thermosetting adhesive layer B described below, and owing to the initial adhesiveness of the thermally expandable thermosetting adhesive layer A, until the adhesive sheet is heated and expanded to bond and fix the member to be inserted and the inserted member together, the adhesive sheet can be temporarily fixed so as not to deviate from a designated position of the member on the first face of the adhesive sheet. Specifically, the shear adhesive strength of the thermally expandable thermosetting adhesive layer A is preferably 0.2 MPa or more, further preferably 0.5 MPa or more, and in view of the capability of obtaining an adhesive sheet having higher temporary fixability, more preferably 1.0 MPa or more. A higher shear adhesive strength of the thermally expandable thermosetting adhesive layer A is more preferred, and the upper limit of the shear adhesive strength can be 2 MPa, for example, and may be 1 MPa. The shear adhesive strength of the thermally expandable thermosetting adhesive layer A can be adjusted by blending additives such as resin components, inorganic fillers, and stickiness imparting agents contained in the thermally expandable thermosetting adhesive layer A described below, for example.

The shear adhesive strength of the thermally expandable thermosetting adhesive layer A can be measured by the following method in conformity with the tensile shear test described in JIS Z 1541. First, a thermally expandable thermosetting adhesive layer similar to the thermally expandable thermosetting adhesive layer A in the adhesive sheet is formed into a sheet shape, the formed product is cut into a size of 10 mm×10 mm and is held between two degreased, smooth-surfaced aluminum plates (15 mm wide× 70 mm long×0.5 mm thick), which are pressure bonded together at 23° C. for 10 seconds with a load of 0.5 MPa, which is a test piece. The test piece is left under a 23° C. environment for 5 minutes, and then the ends of the two aluminum plates are each chucked, and a tensile test is performed at 10 mm/minute in a 180° direction using a Tensilon tensile testing machine, and the value obtained in this case can be used as the shear adhesive strength.

The thermally expandable thermosetting adhesive layer A expands by heating and causes a thermosetting reaction and can thus develop adhesive strength that can withstand even high temperature environments. The thermally expandable thermosetting adhesive layer A has a thickness direction expansion rate of the thermally expandable thermosetting adhesive layer A after heating at 150° C. for 60 minutes of 130% or more and can thereby sufficiently fill the cavity of the inserted member together with the expansion of the thermally expandable thermosetting adhesive layer B described below. The expansion rate is especially preferably 150% or more, more preferably 175% or more, and particularly preferably 200% or more. If the expansion rate of the thermally expandable thermosetting adhesive layer A after expansion is too large, the layer density becomes sparse, and thermal degradation is likely to occur in high temperature environments, and sufficient adhesive strength may not be able to be developed and maintained. Thus, the thickness direction expansion rate of the thermally expandable thermosetting adhesive layer A after heating at 150° C. for 60 minutes is preferably 1,000% or less, especially preferably 500% or less, further preferably 450% or less, more preferably 400% or less, and particularly preferably 300% or less. The expansion rate of the thermally expandable thermosetting adhesive layer A after heating at 150° C. for 60 minutes being within the above range can sufficiently fill the cavity of the inserted member by the expansion of the thermally expandable thermosetting adhesive layer A and maintain high adhesive strength to the member to be inserted or the inserted member, which is an adherend, to firmly bond the member to be inserted and the inserted member together.

The thickness direction expansion rate (%) of the thermally expandable thermosetting adhesive layer A after heating at 150° C. for 60 minutes (the expanded product of the thermally expandable thermosetting adhesive layer A) is a value calculated based on the following method and equation. First, the thickness of the thermally expandable thermosetting adhesive layer A in the adhesive sheet before heating is measured under a 23° C. environment. Next, after heating the adhesive sheet under a 150° C. environment for 60 minutes, the adhesive sheet is taken out to a 23° C. environment, and immediately, the thickness of the thermally expandable thermosetting adhesive layer A in the adhesive sheet after heating is measured. Based on the above measurement result and the following equation, the expansion rate is calculated.

> Thickness direction expansion rate (%) of thermally expandable thermosetting adhesive layer A after heating=[thickness of thermally expandable thermosetting adhesive layer A after heating/ thickness of thermally expandable thermosetting adhesive layer A before heating]×100(%)

Instead of the adhesive sheet, the same thermally expandable thermosetting adhesive layer A as the thermally expandable thermosetting adhesive layer A in the adhesive sheet formed on a release liner may be used as a test sample, and the expansion rate may be calculated based on the above equation from the thicknesses of the thermally expandable thermosetting adhesive layer A before and after heating the test sample at 150° C. for 60 minutes.

The thermally expandable thermosetting adhesive layer A after expansion has a shear adhesive strength under a room temperature (23° C.) environment of preferably 3 MPa or more, further preferably 6 MPa or more, and more preferably 9 MPa or more. The shear adhesive strength of the thermally expandable thermosetting adhesive layer A after expansion and curing being within the above range improves adhesion retention performance to the member to be inserted and the inserted member. A higher shear adhesive strength of the thermally expandable thermosetting adhesive layer A after expansion is more preferred, and the upper limit of the shear adhesive strength after expansion is not limited to a particular value and can be 30 MPa, for example, and may be 15 MPa.

The shear adhesive strength of the thermally expandable thermosetting adhesive layer A after expansion can be measured in conformity with the tensile shear test described in JIS Z 1541, and the method is the same as the method for measuring the shear adhesive strength of the thermally expandable thermosetting adhesive layer A before expansion described above except that the tensile test was performed after heating the test piece at 150° C. for 60 minutes.

The thickness of the thermally expandable thermosetting adhesive layer A is preferably 1 μm or more, more preferably in a range of 10 μm to 250 μm, further preferably in a range of 15 μm to 150 μm, and particularly preferably in a range of 20 μm to 100 μm in view of obtaining even better adhesive strength. The thickness of the thermally expandable thermosetting adhesive layer A after expansion is preferably in a range of 20 μm to 2,500 μm and more preferably in a range of 30 μm to 1,500 μm in view of obtaining even better adhesive strength. The thermally expandable thermosetting adhesive layer A after expansion preferably has a porous structure.

The thickness of the thermally expandable thermosetting adhesive layer A with respect to the total thickness of the adhesive sheet is preferably 10% or more and more preferably 30% or more. This is because being the above range makes it easier to fill the cavity while fixing the member to be inserted having been inserted into the cavity of the inserted member. When the adhesive sheet has the release liner, the total thickness of the adhesive sheet shall not include the thickness of the release liner.

The glass transition temperature of the thermally expandable thermosetting adhesive layer A after expansion is preferably 80° C. or higher because it can exhibit excellent adhesive strength even when exposed to high temperature environments and can firmly maintain the bonding between the member to be inserted and the inserted member especially used for uses that are prone to reach high temperatures. More specifically, the glass transition temperature of the thermally expandable thermosetting adhesive layer A after expansion is preferably 100° C. or higher and 300° C. or lower, further preferably 120° C. or higher and 280° C. or lower, and more preferably 150° C. or higher and 250° C. or lower.

The glass transition temperature of the thermally expandable thermosetting adhesive layer A after expansion refers to a peak temperature determined in a spectrum of loss tangent (tan δ) calculated, after measuring the storage modulus (E') and the loss modulus (E") at a frequency of 1 Hz using a dynamic viscoelasticity measuring apparatus (manufactured by Rheometrics, product name: RSA-II) with a test piece chucked with a gripper, which is a measuring part of the tester, from a value (E"/E') obtained by dividing the loss modulus (E") by the storage modulus (E'). The test piece used for the above measurement can be measured using a piece of the thermally expandable thermosetting adhesive layer A after expansion after heating at 150° C. for 60 minutes punched out in the shape of the test piece type 5 of JIS K 7127 using a dumbbell cutter.

The thermally expandable thermosetting adhesive layer A preferably makes a curing rate after expansion 80% or more. Setting the above curing rate can exhibit excellent adhesive strength even when exposed to high temperature environments and can firmly maintain the bonding between the member to be inserted and the inserted member especially used for uses that are prone to reach high temperatures. The curing rate after expansion is more preferably made 90% or more, and the curing rate is further preferably made 99% or more.

The curing rate of the thermally expandable thermosetting adhesive layer A after expansion is expressed in terms of gel fraction and refers to a value calculated based on, after immersing the thermally expandable thermosetting adhesive layer A after expansion obtained by heating the thermally expandable thermosetting adhesive layer A at 150° C. for 60 minutes in a toluene solution adjusted to 23° C. for 24 hours, the mass of the thermally expandable thermosetting adhesive layer remaining in the solvent after drying and the following equation.

> Gel fraction (% by mass)={(mass of thermally expandable thermosetting adhesive layer after expansion remaining without being dissolved in toluene)/(mass of thermally expandable thermosetting adhesive layer after expansion before immersion in toluene)}×100

The thermally expandable thermosetting adhesive layer A is a layer containing at least a thermosetting resin and an expansion agent. In other words, the thermally expandable thermosetting adhesive layer A is a layer formed by a thermally expandable thermosetting adhesive composition a containing at least a thermosetting resin and an expansion agent. The thermally expandable thermosetting adhesive layer A can be formed by applying the thermally expandable thermosetting adhesive composition a to a release liner or the like and drying it, for example.

The term "in (the entire resin component of) the thermally expandable thermosetting adhesive layer A" can be defined namely as "in (the entire resin component of) the thermally expanding thermosetting adhesive composition a forming the thermally expanding thermosetting adhesive layer A." The resin component is defined as a resin component forming the adhesive composition excluding the expansion agent.

(Thermosetting Resin)

The thermally expandable thermosetting adhesive layer A contains at least a thermosetting resin as the resin component. As the thermosetting resin contained in the thermally expandable thermosetting adhesive layer A, one or two or more thermosetting resins selected from urethane resins, phenolic resins, unsaturated polyester resins, epoxy resins, acrylic resins, and the like can be used, for example. Among them, as the thermosetting resin, epoxy resins and/or acrylic resins are preferably used in view of imparting good adhesiveness to an adherend during expansion by heating, and further, epoxy resins are more preferably used in view of ensuring good heat curability and having high heat resistance.

Specific examples of the epoxy resins include bisphenol type epoxy resins such as bisphenol A type epoxy resins and bisphenol F type epoxy resins, aliphatic epoxy resins, dicyclopentadiene type epoxy resins such as dicyclopentadiene-phenol addition reaction type epoxy resins, biphenyl type epoxy resins, tetramethylbiphenyl type epoxy resins, polyhydroxynaphthalene type epoxy resins, isocyanate-modified epoxy resins, 10-(2,5-dihydroxyphenyl)-9,10-dihydro-9-oxa-10-phosphaphenanthrene-10-oxide-modified epoxy resins, phenol novolac type epoxy resins, cresol novolac type epoxy resins, triphenylmethane type epoxy resins, tetraphenylethane type epoxy resins, phenol aralkyl type epoxy resins, naphthol novolac type epoxy resins, naphthol aralkyl type epoxy resins, naphthol-phenol co-condensed novolac type epoxy resins, naphthol-cresol co-condensed novolac type epoxy resins, aromatic hydrocarbon formaldehyde resin-modified phenolic resin type epoxy resins, and biphenyl-modified novolac type epoxy resins. One epoxy resin may be used alone or two or more epoxy resins may be used in combination.

The thermosetting resin contained in the thermally expandable thermosetting adhesive layer A preferably has a total epoxy equivalent weight of 2,000 g/eq. or less. This is preferred because the glass transition temperature of the thermally expandable thermosetting adhesive layer A after expansion can be raised, and a reduction in adhesive strength under high temperatures can be inhibited. The total epoxy equivalent weight is preferably 50 g/eq. or more and 1,500 g/eq. or less, 100 g/eq. or more and 1,000 g/eq. or less, and 150 g/eq. or more and 500 g/eq. or less.

The thermally expandable thermosetting adhesive layer A preferably contains, as the thermosetting resin, an epoxy resin with an epoxy equivalent weight of 500 g/eq. or less in a range of 30% by mass to 90% by mass in the entire resin component of the thermally expandable thermosetting adhesive layer A because it can raise the glass transition temperature of the thermally expandable thermosetting adhesive layer A after expansion and inhibit a reduction in adhesive strength under high temperatures. The epoxy equivalent weight of the epoxy resin contained in the thermally expandable thermosetting adhesive layer A is preferably 10 g/eq. or more and 450 g/eq. or less, 20 g/eq. or more and 400 g/eq. or less, and 50 g/eq. or more and 300 g/eq or less. The content of the epoxy resin having an epoxy equivalent weight in the above range is preferably in a range of 35% by mass to 85% by mass, in a range of 40% by mass to 80% by mass, and in a range of 50% by mass to 70% by mass in the entire resin component of the thermally expandable thermosetting adhesive layer A. The content of the epoxy resin having an epoxy equivalent weight in the above range, when two or more epoxy resins having an epoxy equivalent weight in the above range are contained, shall be the total amount of them.

The "epoxy equivalent weight" in the present application is defined by the molecular weight of epoxy resin per epoxy group and can be determined by the method described in JIS K7236, How to determine the epoxy equivalent weight of epoxy resin (2001) (the perchloric acid-tetraethylammonium bromide method) or the like.

The thermally expandable thermosetting adhesive layer A preferably contains one or two or more solid thermosetting resins (hereinafter, referred to as a solid resin. The same shall apply to the thermally expandable thermosetting adhesive layer B.) as the thermosetting resin. The "solid resin" in the present specification refers to resins with a high softening point or resins that are semi-solid or solid at 25° C. The softening point of the solid resin is preferably 5° C. or higher. As the thermosetting resin, especially a solid resin with a softening point of 30° C. or higher and 150° C. or lower is preferably contained, and a solid resin with a softening point of 50° C. or higher and 100° C. or lower is more preferably contained. The content of the solid resin is preferably 10% by mass or more and more preferably 20% by mass or more, 30% by mass or more, 40% by mass or more, and 50% by mass or more in the entire resin component of the thermally expandable thermosetting adhesive layer A. The content of the solid resin is preferably 95% by mass or less and more preferably 90% by mass or less, 85% by mass or less, 80% by mass or less, and 70% by mass or less in the entire resin component of the thermally expandable thermosetting adhesive layer A. As to the content, more specifically, the content of the solid resin is preferably 10% by mass or more, especially preferably 20% by mass or more and 95% by mass or less, and preferably 40% by mass or more and 70% by mass or less. This is because it can impart the initial adhesiveness (stickiness) of the thermally expandable thermosetting adhesive layer A and easily maintains the sheet shape at room temperature to improve handleability. When two or more solid resins are contained, the content of the solid resin shall be the total amount of the two or more solid resins.

Specific examples of the solid resin include phenol novolac type epoxy resins, cresol novolac type epoxy resins, triphenylmethane type epoxy resins, tetraphenylethane type epoxy resins, dicyclopentadiene-phenol addition reaction type epoxy resins, phenol aralkyl type epoxy resins, naphthol novolac type epoxy resins, naphthol aralkyl type epoxy resins, naphthol-phenol co-condensed novolac type epoxy resins, and naphthol-cresol co-condensed novolac type epoxy resins. One solid resin may be used alone or two or more solid resins may be used.

The thermally expandable thermosetting adhesive layer A preferably contains a thermosetting resin that is liquid at 25° C. (hereinafter, referred to as a liquid resin. The same shall apply to the thermally expandable thermosetting adhesive layer B). This is because the shear adhesive strength of the thermally expandable thermosetting adhesive layer A can be increased, and good temporary fixability can be developed. The liquid resin contained in the thermally expandable thermosetting adhesive layer A has a viscosity at 25° C. of preferably 3,000,000 mPa·sec or less, especially further preferably 10 mPa·sec or more and 2,000,000 mPa·sec or less, and more preferably 1,000 mPa·sec or more and 1,000,000 mPa·sec or less. The content of the liquid resin in the thermally expandable thermosetting adhesive layer A is preferably 10% by mass or more, especially preferably 15% by mass or more, further preferably 20% by mass or more, and more preferably 30% by mass or more in the entire resin component of the thermally expandable thermosetting adhesive layer A. The content of the liquid resin is preferably 70% by mass or less, further preferably 60% by mass or less, and more preferably 50% by mass or less in the entire resin component of the thermally expandable thermosetting adhesive layer A. More specifically, the content of the liquid resin in the thermally expandable thermosetting adhesive layer A can be 10% by mass or more, 15% by mass or more and 70% by mass or less, 20% by mass or more and 60% by mass or less, and 30% by mass or more and 50% by mass or less in the entire resin component of the thermally expandable thermosetting adhesive layer A. The liquid resin having a desired viscosity described above being contained in the thermally expandable thermosetting adhesive layer A in a desired content can suitably impart the initial adhesiveness (stickiness) of the thermally expandable thermosetting adhesive layer and can obtain an adhesive sheet having higher temporary fixability. When two or more liquid resins are contained, the content of the liquid resin shall be the total amount of the two or more liquid resins.

The liquid resin contained in the thermally expandable thermosetting adhesive layer A can be used with the viscosity range and the content range described above combined with each other as appropriate. As an example of preferred modes, the thermally expandable thermosetting adhesive layer A preferably contains a liquid resin with a viscosity at 25° C. of 3,000,000 mPa·sec or less in 20% by mass or more, for example. As another example of preferred modes, the thermally expandable thermosetting adhesive layer A preferably contains a liquid resin with a viscosity described above of 10 mPa·sec or more and 2,000,000 mPa·sec or less in 12% by mass or more and 70% by mass or less, for example. As another example of preferred modes, the thermally expandable thermosetting adhesive layer A preferably contains a liquid resin with a viscosity described above of 1,000 mPa·sec or more and 1,000,000 mPa·sec or less in 15% by mass or more and 50% by mass or less, for example. The liquid resin in the thermally expandable thermosetting adhesive layer A being contained in a desired viscosity and content enables adjustment to a desired shear adhesive strength and can have good initial adhesiveness.

Specific examples of the liquid resin include bisphenol type epoxy resins such as bisphenol A type epoxy resins and bisphenol F type epoxy resins and modified resins thereof, aliphatic epoxy resins, trimethylol propane type epoxy resins, alicyclic epoxy resins, 1,6-dihydroxynaphthalene type epoxy resins, t-butyl catechol type epoxy resins, 4,4'-diphenyldiaminomethane type epoxy resins, p- or m-aminophenol type epoxy resins, trimethylolpropane type epoxy resins, 1,6-hexanediol type epoxy resins, 1,4-butanediol type epoxy resins, and fatty chain-modified epoxy resins. One liquid resin may be used alone or two or more liquid resins may be used.

In the thermally expandable thermosetting adhesive layer A, the blending ratio between the solid resin and the liquid resin described above (solid:liquid) is enough to be a ratio capable of making the shear adhesive strength of the thermally expandable thermosetting adhesive layer A in a desired range and is preferably in a range of 95:5 to 40:60, preferably in a range of 90:10 to 50:50, and preferably in a range of 80:20 to 60:40 in terms of mass ratio, for example. The blending ratio between the solid resin and the liquid resin contained in the thermally expandable thermosetting adhesive layer A being set to the above range enables adjustment to a desired shear adhesive strength and can have good initial adhesiveness.

For the thermally expandable thermosetting adhesive layer A, it is desirable to use a thermosetting resin with a weight average molecular weight of 100 or more and 20,000 or less as the thermosetting resin in view of the capability of suitably imparting the initial adhesiveness (stickiness) of the thermally expandable thermosetting adhesive layer and obtaining an adhesive sheet having higher temporary fixability. The weight average molecular weight of the thermosetting resin is especially preferably 150 or more and 10,000 or less and more preferably 200 or more and 4,000 or less. The weight average molecular weight of the thermosetting resin is a value in terms of standard polystyrene.

The total content of the thermosetting resin is preferably contained in a range of 10% by mass to 99% by mass, is further preferably contained in a range of 40% by mass to 80% by mass, and is more preferably contained in a range of 50% by mass to 70% by mass in 100% by mass of the entire resin component of the thermally expandable thermosetting adhesive layer A. The content of the thermosetting resin in the thermally expandable thermosetting adhesive layer A being set to be within the above range can suitably impart the initial adhesiveness (stickiness) of the thermally expandable thermosetting adhesive layer, obtain an adhesive sheet having higher temporary fixability, and easily maintain the sheet shape at room temperature to improve handleability. The thermally expandable thermosetting adhesive layer A is preferably a layer containing the thermosetting resin as its main component and more preferably a layer containing epoxy resin as its main component.

(Expansion Agent)

As the expansion agent contained in the thermally expandable thermosetting adhesive layer A, it is preferable to use one that enables the thermally expandable thermosetting adhesive layer A after expansion to form a porous structure in the layer. Examples of such an expansion agent include inorganic compounds such as ammonium carbonate, ammonium bicarbonate, ammonium nitrite, ammonium borohydride, and azides, alkane fluorides such as trichloromonofluoromethane, azo compounds such as azobisisobutyronitrile, hydrazine compounds such as paratoluenesulfonylhydrazide, semicarbazide compounds such as p-toluenesulfonylsemicarbazide, triazole compounds such as 5-morpholyl-1,2,3,4-thiatriazole, and N-nitroso compounds such as N,N'-dinitrosoterephthalamide.

As the expansion agent, expandable capsules in which hydrocarbon-based solvent is microencapsulated can be used, for example. One expansion agent may be used alone or two or more expansion agents may be used in combination.

As the expansion agent, among those described above, it is more preferable to use the expandable capsules in which hydrocarbon-based solvent is microencapsulated in view of preventing deterioration or the like of the thermally expandable thermosetting adhesive layer A by the influence of heat, for example.

As the expansion agent, it is preferable to use one that can expand at temperatures around the softening point of the thermally expandable thermosetting adhesive layer A because it can sufficiently expand the adhesive sheet of one or more embodiments of the present invention.

Examples of commercially available products of the expandable capsules include Expancel (manufactured by Japan Fillite Co., Ltd.), Matsumoto Microsphere (manufactured by Matsumoto Yushi-Seiyaku Co., Ltd.), and Microsphere (manufactured by Kureha Corporation). As the expandable capsules, it is preferable to use ones having a volume after expansion with respect to the volume of the capsules before expansion (a volumetric expansion ratio) of 8 times to 60 times.

The content of the expansion agent, preferably the content of the thermally expandable capsules, is preferably in a range of 0.3 part by mass to 30 parts by mass, more preferably in a range of 0.5 part by mass to 25 parts by mass, and further preferably in a range of 1 part by mass to 20 parts by mass with respect to 100 parts by mass of the entire resin component of the thermally expandable thermosetting adhesive layer A. The content of the expansion agent being set to be within the above range can sufficiently fill the cavity of the inserted member and maintain high adhesive strength to the member to be inserted or the inserted member, which is an adherend, to firmly bond the member to be inserted and the inserted member together.

(Curing Agent)

The thermally expandable thermosetting adhesive layer A preferably contains a curing agent that can react with the thermosetting resin. This is because when heating the thermally expandable thermosetting adhesive layer A, the thermosetting resin can sufficiently cure to develop high adhesive strength. The curing agent is preferably contained before the thermally expandable thermosetting adhesive layer A is thermally cured or before forming the thermally expandable thermosetting adhesive layer A in sheet form.

For the curing agent, a compound corresponding to the type of the thermosetting resin, especially the type of a functional group of the thermosetting resin can be selected and used as appropriate. When an epoxy resin is used as the thermosetting resin, for example, as the curing agent, it is preferable to use one having a functional group that can react with its epoxy group. Specific examples of the curing agent include amine-based compounds, amide-based compounds, acid anhydride-based compounds, and phenolic compounds.

Examples of the amine-based compounds include diaminodiphenylmethane, diethylenetriamine, triethylenetetramine, diaminodiphenylsulfone, isophoronediamine, imidazole derivatives, BF3-amine complexes, and guanidine derivatives.

Examples of the amide-based compounds include dicyandiamide and polyamide resins synthesized from a dimer of linolenic acid and ethylenediamine.

Examples of the acid anhydride-based compounds include phthalic anhydride, trimellitic anhydride, pyromellitic anhydride, maleic anhydride, tetrahydro phthalic anhydride, methyl tetrahydro phthalic anhydride, methyl nadic anhydride, hexahydro phthalic anhydride, and methyl hexahydro phthalic anhydride.

Examples of the phenolic compounds include phenol novolac resins, cresol novolac resins, aromatic hydrocarbon formaldehyde resin-modified phenolic resins, dicyclopentadiene-phenol addition type resins, phenol-aralkyl resins (xylok resins), naphthol-aralkyl resins, trimethylolmethane resins, tetraphenylethane resins, naphthol novolac resins, naphthol-phenol co-condensed novolac resins, naphthol-cresol co-condensed novolac resins, biphenyl-modified phenolic resins (polyvalent phenolic compounds with phenolic nuclei linked by bismethylene groups), biphenyl-modified naphthol resins (polyvalent naphthol compounds with phenolic nuclei linked by bismethylene groups), aminotriazine-modified phenolic resins (compounds having a phenolic skeleton, a triazine ring, and a primary amino group in the molecular structure), and polyvalent phenolic compounds such as alkoxy group-containing aromatic ring-modified novolac resins (polyvalent phenolic compounds with a phenolic nucleus and an alkoxy group-containing aromatic ring linked by formaldehyde).

When an epoxy resin is used as the thermosetting resin, for example, the curing agent has a ratio of the equivalent weight of the functional group that can react with the epoxy group contained in the curing agent to the total epoxy equivalent weight of the thermosetting resin of preferably in a range of 0.3 or more and 2.0 or less, more preferably in a range of 0.5 or more and 1.5 or less, and further preferably in a range of 0.7 or more and 1.0 or less. Using within the above range can sufficiently cure the thermosetting resin to improve the heat resistance of the adhesive sheet.

As the curing agent, a powdery one is preferably used. The powdery curing agent inhibits a thermosetting reaction under low temperatures compared to a liquid curing agent, and thus the storage stability of the thermally expandable thermosetting adhesive layer A under room temperature can be further improved.

The content of the curing agent can be set as appropriate so as to be within the range of the curing rate of the thermally expandable thermosetting adhesive layer A after expansion described above.

(Curing Accelerator)

The thermally expandable thermosetting adhesive layer A and the thermally expandable thermosetting adhesive composition a forming it may contain a curing accelerator. The curing accelerator is preferably contained before the thermally expandable thermosetting adhesive layer A is thermally cured or before forming the thermosetting adhesive layer A in sheet form. As the curing accelerator, phosphorus-based compounds, amine compounds, imidazole derivatives, or the like can be used. When using the curing accelerator, the amount of use is preferably 0.1 part by mass to 10 parts by mass and more preferably in a range of 0.5 part by mass to 5 parts by mass with respect to 100 parts by mass of the entire resin component contained in the thermally expandable thermosetting adhesive layer A.

As the curing accelerator, a powdery one is preferably used. The powdery curing accelerator inhibits a thermosetting reaction under low temperatures compared to a liquid curing accelerator, and thus the storage stability of the thermally expandable thermosetting adhesive layer A under room temperature can be further improved.

(Thermoplastic Resin)

The thermally expandable thermosetting adhesive layer A and the thermally expandable thermosetting adhesive composition a forming it may contain a thermoplastic resin to the extent that the fixability of a bonded part is not impaired even when used under an environment with large temperature changes after expansion.

Examples of the thermoplastic resin include thermoplastic resins such as urethane-based resins such as thermoplastic polyurethane (TPU); phenoxy resins such as polyhydroxy polyethers synthesized from bisphenols and epichlorohydrin; polycarbonate (PC); vinyl chloride-based resins such as polyvinyl chloride (PVC) and vinyl chloride-vinyl acetate copolymerized resins; acrylic resins such as polyacrylic acid, polymethacrylic acid, poly(methyl acrylate), poly(methyl methacrylate) (PMMA), and poly(ethyl methacrylate); polyester-based resins such as polyethylene terephthalate (PET), polybutylene terephthalate, polytrimethylene terephthalate, polyethylene naphthalate, and polybutylene naphthalate; polyamide-based resins such as nylon (registered trademark); polystyrene-based resins such as polystyrene (PS), imide-modified polystyrene, acrylonitrile-butadiene-styrene (ABS) resins, imide-modified ABS resins, styrene-acrylonitrile copolymerized (SAN) resins, and acrylonitrile-(ethylene-propylene-diene)-styrene (AES) resins; olefinic resins such as polyethylene (PE) resins, polypropylene (PP) resins, and cycloolefin resins; cellulose-based resins such as nitrocellulose and cellulose acetate; silicone resins; and fluorine-based resins and thermoplastic elastomers such as styrenic thermoplastic elastomers, olefinic thermoplastic elastomers, vinyl chloride-based thermoplastic elastomers, urethane-based thermoplastic elastomers, ester-based thermoplastic elastomers, and amide-based thermoplastic elastomers.

Among them, the thermally expandable thermosetting adhesive layer A preferably contains one or two or more thermoplastic resins having a reactive group reacting with the thermosetting resin (hereinafter, may be referred to as a "reactive thermoplastic resin"). This is because the reactive group of the reactive thermoplastic resin reacts with the thermosetting resin, thereby enabling the thermally expandable thermosetting adhesive layer A to develop higher adhesive strength. Examples of the reactive group reacting with the thermosetting resin include an epoxy group, a hydroxy group, a carboxy group, an amino group, and an isocyanate group. Examples of the thermoplastic resin having such a reactive group include thermoplastic polyurethane (TPU), polyhydroxy polyether (phenoxy resins), and acrylic resins.

For the above reason, the thermoplastic resin can be used in a range of 1 part by mass to 100 parts by mass with respect to 100 parts by mass of the thermosetting resin in the thermally expandable thermosetting adhesive layer A. The thermoplastic resin is especially preferably used in a range of 10 parts by mass to 150 parts by mass and, in view of the capability of developing high adhesive strength, is more preferably used in a range of 30 parts by mass to 100 parts by mass with respect to 100 parts by mass of the thermosetting resin.

(Optional Components)

The thermally expandable thermosetting adhesive layer A can be used containing additives such as fillers, softeners, stabilizers, adhesion promoters, leveling agents, defoamers, plasticizers, stickiness imparting resins, fibers, antioxidants, UV absorbers, hydrolysis inhibitors, thickening agents, coloring agents such as pigments, and fillers to the extent that the effects of one or more embodiments of the present invention are not impaired in addition to the components describes above.

(2) Thermally Expandable Thermosetting Adhesive Layer B

The thermally expandable thermosetting adhesive layer B in one or more embodiments of the present invention contains at least a thermosetting resin and an expansion agent but has a different composition from that of the thermally expandable thermosetting adhesive layer A. The thermally expandable thermosetting adhesive layer B is a layer forming the second face of the adhesive sheet of one or more embodiments of the present invention excluding the release liner.

The thermally expandable thermosetting adhesive layer B is preferably a layer having a lower shear adhesive strength than that of the thermally expandable thermosetting adhesive layer A, especially having low initial adhesiveness (stickiness) or having no initial adhesiveness. When inserting the member to be inserted into the cavity of the inserted member, the occurrence of troubles such as adhesion of the second face of the adhesive sheet to an adherend leading to deviation of the bonding position of the adhesive sheet and its sticking to a position different from a designated position can be prevented, and the insertability can be improved.

The thermally expandable thermosetting adhesive layer B is enough to have a lower shear adhesive strength at room temperature than the shear adhesive strength of the thermally expandable thermosetting adhesive layer A, and specifically, the shear adhesive strength of the thermally expandable thermosetting adhesive layer B is preferably less than 0.5 MPa, especially preferably 0.3 MPa or less, further preferably 0.2 MPa or less, and in view of preventing the occurrence of troubles such as sticking of the second face of the adhesive sheet of one or more embodiments of the present invention to a position different from a designated position and the capability of increasing the insertability when inserting the member to be inserted into the cavity, more preferably 0.1 MPa or less. A lower shear adhesive strength of the thermally expandable thermosetting adhesive layer B is more preferred because the initial adhesiveness disappears and the insertability when inserting the member to be inserted into the cavity improves, and the lower limit value is preferably 0 MPa and may be 0.01 MPa or more. The shear adhesive strength of the thermally expandable thermosetting adhesive layer B can be adjusted by blending additives such as resin components, inorganic fillers, and slip agents contained in the thermally expandable thermosetting adhesive layer B described below, for example.

The shear adhesive strength of the thermally expandable thermosetting adhesive layer B can be measured by the same method as the method for measuring the shear adhesive strength of the thermally expandable thermosetting adhesive layer A described above.

The thermally expandable thermosetting adhesive layer B expands by heating and causes a thermosetting reaction and can thus develop high adhesive strength even under high temperature environments. The thermally expandable thermosetting adhesive layer B has a thickness direction expansion rate of the thermally expandable thermosetting adhesive layer B after heating at 150° C. for 60 minutes of 130% or more and can thereby sufficiently fill the cavity of the inserted member together with the expansion of the thermally expandable thermosetting adhesive layer A described above. The expansion rate of the thermally expandable thermosetting adhesive layer B is especially preferably 150% or more, more preferably 175% or more, and particularly preferably 200% or more. If the expansion rate of the thermally expandable thermosetting adhesive layer B is too large, its layer density becomes sparse, and thus it may not be able to develop sufficient adhesive strength due to degradation especially in high temperature environments. Thus, the thickness direction expansion rate of the thermally expandable thermosetting adhesive layer B after heating at 150° C. for 60 minutes is preferably 1,000% or less, especially preferably 500% or less, more preferably 450% or less, further preferably 400% or less, and particularly preferably 300% or less. The expansion rate of the thermally expandable thermosetting adhesive layer B after heating at 150° C. for 60 minutes being within the above range can sufficiently fill the cavity of the inserted member by the expansion of the thermally expandable thermosetting adhesive layer B and maintain high adhesive strength to the member to be inserted or the inserted member, which is an adherend, to firmly bond the member to be inserted and the inserted member together even in high temperature environments.

The thickness direction expansion rate (%) of the thermally expandable thermosetting adhesive layer B after heating at 150° C. for 60 minutes can be calculated based on the following equation after measuring the thicknesses of the thermally expandable thermosetting adhesive layer B before and after heating by the same method as that for the thickness direction expansion rate (%) of the thermally expandable thermosetting adhesive layer A described above.

Thickness direction expansion rate (%) of thermally expandable thermosetting adhesive layer B after heating=[thickness of thermally expandable thermosetting adhesive layer B after heating/ thickness of thermally expandable thermosetting adhesive layer B before heating]×100(%)

The thermally expandable thermosetting adhesive layer B after expansion has a shear adhesive strength under a room temperature (23° C.) environment of preferably 3 MPa or more, further preferably 6 MPa or more, and more preferably 9 MPa or more. The shear adhesive strength of the thermally expandable thermosetting adhesive layer B after expansion being within the above range improves an adhesion retention function to the member to be inserted and the inserted member. A higher shear adhesive strength of the thermally expandable thermosetting adhesive layer B after expansion is more preferred, which can be 30 MPa or less, for example, and may be 15 MPa.

The shear adhesive strength of the thermally expandable thermosetting adhesive layer B after expansion can be measured by the same method as the method for measuring the shear adhesive strength of the thermally expandable thermosetting adhesive layer A after expansion described above.

The thickness of the thermally expandable thermosetting adhesive layer B is preferably 1 μm or more, more preferably in a range of 10 μm to 250 μm, further preferably in a range of 20 μm to 200 μm, and particularly preferably in a range of 40 μm to 150 μm in view of obtaining even better adhesive strength.

The thickness of the thermally expandable thermosetting adhesive layer B after expansion is preferably in a range of 50 μm to 2,500 μm and more preferably in a range of 60 μm to 1,500 μm in view of obtaining even better adhesive strength. The thermally expandable thermosetting adhesive layer B after expansion preferably has a porous structure.

The thickness of the thermally expandable thermosetting adhesive layer B with respect to the total thickness of the adhesive sheet is preferably 15% or more and more preferably 35% or more. This is because being the above range makes it easier to fill the cavity while fixing the member to be inserted having been inserted into the cavity of the inserted member. When the adhesive sheet has the release liner, the total thickness of the adhesive sheet shall not include the thickness of the release liner.

The glass transition temperature of the thermally expandable thermosetting adhesive layer B after expansion is preferably 80° C. or higher. This is because the thermally expandable thermosetting adhesive layer B after expansion can exhibit excellent adhesive strength even when exposed to high temperature environments and can firmly maintain the bonding between the member to be inserted and the inserted member especially used for uses that are prone to reach high temperatures. More specifically, the glass transition temperature of the thermally expandable thermosetting adhesive layer B after expansion is preferably 100° C. or higher and 300° C. or lower, further preferably 120° C. or higher and 280° C. or lower, and more preferably 150° C. or higher and 250° C. or lower.

The glass transition temperature of the thermally expandable thermosetting adhesive layer B after expansion can be measured by the same method as the method for measuring the glass transition temperature of the thermally expandable thermosetting adhesive layer A after expansion described above.

The thermally expandable thermosetting adhesive layer B preferably makes a curing rate after expansion 80% or more. Setting the above curing rate can exhibit excellent adhesive strength even when exposed to high temperature environments and can firmly maintain the bonding between the member to be inserted and the inserted member especially used for uses that are prone to reach high temperatures. The curing rate after expansion is more preferably made 90% or more, and the curing rate is further preferably made 99% or more.

The curing rate of the thermally expandable thermosetting adhesive layer B after expansion is expressed in terms of gel fraction and refers to a value measured and calculated by the same method as that for the thermally expandable thermosetting adhesive layer A after expansion described above.

The thermally expandable thermosetting adhesive layer B is a layer containing at least a thermosetting resin and an expansion agent. In other words, the thermally expandable thermosetting adhesive layer B is a layer formed by a thermally expandable thermosetting adhesive composition b containing at least a thermosetting resin and an expansion agent. The thermally expandable thermosetting adhesive layer B can be formed by applying the thermally expandable thermosetting adhesive composition b to a release liner or the like and drying it.

The term "in (the entire resin component of) the thermally expandable thermosetting adhesive layer B" can be defined namely as "in (the entire resin component of) the thermally expanding thermosetting adhesive composition b forming the thermally expanding thermosetting adhesive layer B."

(Thermosetting Resin)

The thermally expandable thermosetting adhesive layer B contains at least a thermosetting resin as the resin component. As the thermosetting resin contained in the thermally expandable thermosetting adhesive layer B, one or two or more thermosetting resins selected from urethane resins, phenolic resins, unsaturated polyester resins, epoxy resins, acrylic resins, and the like can be used, for example. Among them, as the thermosetting resin, epoxy resins and/or acrylic resins are preferably used in view of imparting good adhesiveness to an adherend during heat curing, and further, epoxy resins are more preferably used in view of ensuring good heat curability and high heat resistance.

As the epoxy resins, specifically, the epoxy resins exemplified in the section "Thermally Expandable Thermosetting Adhesive Layer A" can be used.

The thermosetting resin contained in the thermally expandable thermosetting adhesive layer B preferably has a total epoxy equivalent weight of 2,000 g/eq. or less. This is preferred because the glass transition temperature of the thermally expandable thermosetting adhesive layer after expansion can be raised, and a reduction in adhesive strength under high temperatures can be inhibited. The total epoxy equivalent weight is preferably 50 g/eq. or more and 1,500 g/eq. or less, 100 g/eq. or more and 1,000 g/eq. or less, and 150 g/eq. or more and 500 g/eq. or less.

The thermosetting resin contained in the thermally expandable thermosetting adhesive layer B preferably contains an epoxy resin with an epoxy equivalent weight of 500 g/eq. or less in a range of 30% by mass to 90% by mass in the entire resin component of the thermally expandable thermosetting adhesive layer B. Containing an epoxy resin with a high epoxy equivalent weight having an epoxy equivalent weight in the above range in a desired amount is preferred because it can raise the glass transition temperature of the thermally expandable thermosetting adhesive layer after expansion and inhibit a reduction in adhesive strength under high temperatures. The epoxy equivalent weight is preferably 20 g/eq. or more and 450 g/eq. or less, 50 g/eq. or more and 400 g/eq. or less, and 100 g/eq. or more and 300 g/eq or less. The content of the epoxy resin having an epoxy equivalent weight in the above range is preferably in a range of 35% by mass or more and 85% by mass or less, in a range of 40% by mass or more and 80% by mass or less, and in a range of 50% by mass or more and 70% by mass or less. The content of the epoxy resin having an epoxy equivalent weight in the above range, when two or more epoxy resins having an epoxy equivalent weight in the above range are contained, shall be the total amount of them.

The thermally expandable thermosetting adhesive layer B preferably contains a solid resin as the thermosetting resin. The solid resin contained in the thermally expandable thermosetting adhesive layer B has a softening point of preferably 5° C. or higher and 150° C. or lower and further preferably 50° C. or higher and 100° C. or lower. The content of the solid resin in the thermally expandable thermosetting adhesive layer B is preferably 30% by mass or more and more preferably 50% by mass or more, 60% by mass or more, 70% by mass or more, 80% by mass or more, 85% by mass or more, and 90% by mass or more in the entire resin component of the thermally expandable thermosetting adhesive layer B. The content is preferably 99% by mass or less and more preferably 97% by mass and 95% by mass in the entire resin component of the thermally expandable thermosetting adhesive layer B. More specifically, the content of the solid resin is preferably 30% by mass or more, preferably 50% by mass or more and 99% by mass or less, and further preferably 70% by mass or more and 95% by mass or less. This is because the initial adhesiveness (stickiness) of the thermally expandable thermosetting adhesive layer B can be reduced, and when inserting the member to be inserted into the cavity of the inserted member, the occurrence of troubles such as deviation of the bonding position of the adhesive sheet and its sticking to a position different from a designated position can be prevented, and the insertability can be improved.

Specific examples of the solid resin include the solid resins exemplified in the section "(1) Thermally Expandable Thermosetting Adhesive Layer A" described above. One solid resin may be used alone or two or more solid resins may be used. When two or more solid resins are contained, the content of the solid resin shall be the total amount of the two or more solid resins.

The thermally expandable thermosetting adhesive layer B may contain a thermosetting resin that is liquid at 25° C. (hereinafter, referred to as a liquid resin) in combination as needed but does not necessarily contain it. The viscosity at 25° C. of the liquid thermosetting resin is preferably 3,000,000 mPa·sec or less, especially further preferably 1,000 mPa·sec or more and 2,000,000 mPa·sec or less, and more preferably 10,000 mPa·sec or more and 1,500,000 mPa·sec or less. When the thermally expandable thermosetting adhesive layer B contains the liquid resin, the content of the liquid resin is preferably 40% by mass or less, especially preferably 30% by mass or less, further preferably 20% by mass or less, and more preferably 10% by mass or less in the entire resin component of the thermally expandable thermosetting adhesive layer B. The content of the liquid resin may be 0% by mass, or more than 0% by mass, or may be contained in 1% by mass or more, contained in 3% by mass or more, and contained in 5% by mass or more. More specifically, the content can be 40% by mass or less, 1% by mass or more and 30% by mass or less, 3% by mass or more and 20% by mass or less, and 5% by mass or more and 10% by mass or less. The liquid resin having a desired viscosity described above being contained in the thermally expandable thermosetting adhesive layer B in a desired content can reduce the initial adhesive strength of the thermally expandable thermosetting adhesive layer B and, when inserting the member to be inserted into the cavity of the inserted member, prevent the occurrence of troubles such as deviation of the bonding position of the adhesive sheet and its sticking to a position different from a designated position to improve the insertability. In addition, the flexibility of the thermally expandable thermosetting adhesive layer B before expansion and its fluidity during heating can be made suitable, and the handleability of the adhesive sheet of one or more embodiments of the present invention and the expansion rate of the adhesive sheet by heating can be made suitable.

When the thermally expandable thermosetting adhesive layer B contains the liquid resin, the liquid resin can be used with the viscosity range and the content range described above combined with each other as appropriate. As an example of preferred modes, the thermally expandable thermosetting adhesive layer B preferably contains a liquid resin with a viscosity at 25° C. of 3,000,000 mPa·sec or less in 20% by mass or less. As another example of preferred modes, the thermally expandable thermosetting adhesive layer B preferably contains a liquid resin with a viscosity described above of in a range of 1,000 mPa·sec to 2,000,000 mPa·sec in a range of 1% by mass to 15% by mass. As another example of preferred modes, the thermally expandable thermosetting adhesive layer B preferably contains a liquid resin with a viscosity described above of in a range of 10,000 mPa·sec to 1,500,000 mPa·sec in a range of 3% by mass to 10% by mass, for example. This is because the shear adhesive strength of the thermally expandable thermosetting adhesive layer B and the second face of the adhesive sheet formed by the thermally expandable thermosetting adhesive layer B can be made sufficiently low, and the insertability improves.

Specific examples of such a liquid resin include the liquid resins exemplified in the section "(1) Thermally Expandable Thermosetting Adhesive Layer A" described above. One liquid resin may be used alone or two or more liquid resins may be used. When two or more liquid resins are contained, the content of the liquid resin shall be the total amount of the two or more liquid resins.

In the thermally expandable thermosetting adhesive layer B, the blending ratio between the solid resin and the liquid resin (the solid resin:the liquid resin) is enough to be a ratio capable of making the shear adhesive strength of the thermally expandable thermosetting adhesive layer B in a desired range and is preferably in a range of 99.9:0.1 to 60:40, preferably in a range of 99:1 to 70:30, and preferably in a range of 95:5 to 80:20 in terms of mass ratio, for example. This is because the blending ratio between the solid resin and the liquid resin being set to the above range can make the shear adhesive strength of the thermally expandable thermosetting adhesive layer B and the second face of the adhesive sheet including the thermally expandable thermosetting adhesive layer B sufficiently lower than the shear adhesive strength of the first face.

For the thermally expandable thermosetting adhesive layer B, it is desirable to use a thermosetting resin with a weight average molecular weight of 100 or more and 20,000 or less in view of the capability of reducing the initial adhesiveness (stickiness) of the thermally expandable thermosetting resin layer and, when inserting the member to be inserted into the cavity of the inserted member, preventing the occurrence of troubles such as deviation of the bonding position of the adhesive sheet and its sticking to a position different from a designated position and obtaining an adhesive sheet with high insertability. The weight average molecular weight of the thermosetting resin is especially preferably 250 or more and 10,000 or less and more preferably 500 or more and 5,000 or less.

The total amount of the thermosetting resin is preferably contained in a range of 30% by mass to 99% by mass, is further preferably contained in a range of 35% by mass to 70% by mass, and is more preferably contained in a range of percent by mass of 40% by mass to 60% by mass in 100% by mass of the entire resin component of the thermally expandable thermosetting adhesive layer B. The content of the thermosetting resin in the thermally expandable thermosetting adhesive layer B being set to be within the above range can reduce the initial adhesiveness (stickiness) of the thermally expandable thermosetting adhesive layer more suitably to obtain an adhesive sheet having higher insertability and can easily maintain the sheet shape at room temperature to improve the handleability.

(Expansion Agent)

The thermally expandable thermosetting adhesive layer B contains one or two or more expansion agents. As the expansion agent, it is preferable to use one that enables the thermally expandable thermosetting adhesive layer B after expansion to form a porous structure in the layer. The details of the expansion agent can be the same as the details of the expansion agent described in the section "(1) Thermally Expandable Thermosetting Adhesive Layer A" described above. The expansion agent and its content contained in the thermally expandable thermosetting adhesive layer B may be the same as or different from the expansion agent and its content contained in the thermally expandable thermosetting adhesive layer A.

The content of the expansion agent, preferably the content of the thermally expandable capsules, is preferably in a range of 0.3 part by mass to 30 parts by mass, more preferably in a range of 0.5 part by mass to 25 parts by mass, and further preferably in a range of 1 part by mass to 20 parts by mass with respect to 100 parts by mass of the entire resin component of the thermally expandable thermosetting adhesive layer B. The content of the expansion agent being set to be within the above range can sufficiently fill the cavity of the inserted member and maintain high adhesive strength to the member to be inserted or the inserted member, which is an adherend, to firmly bond the member to be inserted and the inserted member together.

(Curing Agent)

The thermally expandable thermosetting adhesive layer B preferably contains one or two or more curing agents that can react with the thermosetting resin. This is because when heating the thermally expandable thermosetting adhesive layer B, the thermosetting resin can sufficiently cure to develop high adhesive strength. The curing agent is preferably contained before the thermally expandable thermosetting adhesive layer B is thermally cured or before forming the thermosetting adhesive layer B in sheet form. The details of the curing agent can be the same as the details of the curing agent described in the section "(1) Thermally Expandable Thermosetting Adhesive Layer A" described above. The curing agent contained in the thermally expandable thermosetting adhesive layer B may be the same as or different from the curing agent contained in the thermally expandable thermosetting adhesive layer A.

The curing agent is preferably used in a range of 0.1 part by mass to 60 parts by mass, is preferably used in a range of 0.5 part by mass to 45 parts by mass, and because of the capability of sufficiently curing the thermosetting resin, is more preferably used in a range of 1 part by mass to 30 parts by mass with respect to a total of 100 parts by mass of the thermosetting resin contained in the thermally expandable thermosetting adhesive layer B.

(Curing Accelerator)

The thermally expandable thermosetting adhesive layer B may contain a curing accelerator. The details of the curing accelerator can be the same as the details of the curing accelerator described in the section "(1) Thermally Expandable Thermosetting Adhesive Layer A" described above. The curing accelerator contained in the thermally expandable thermosetting adhesive layer B may be the same as or different from the curing accelerator contained in the thermally expandable thermosetting adhesive layer A.

(Thermoplastic Resin)

The thermally expandable thermosetting adhesive layer B may contain a thermoplastic resin to the extent that the fixability of a bonded part is not impaired even when used under an environment with large temperature changes after expansion. The details and content of the thermoplastic resin can be the same as the details and content of the thermoplastic resin described in the section "(1) Thermally Expandable Thermosetting Adhesive Layer A" described above. The thermoplastic resin contained in the thermally expandable thermosetting adhesive layer B may be the same as or different from the thermoplastic resin contained in the thermally expandable thermosetting adhesive layer A.

(Other Optional Components)

The thermally expandable thermosetting adhesive layer B can be used containing additives such as fillers, softeners, stabilizers, adhesion promoters, leveling agents, defoamers, plasticizers, stickiness imparting resins, fibers, antioxidants, UV absorbers, hydrolysis inhibitors, thickening agents, coloring agents such as pigments, and fillers to the extent that the effects of one or more embodiments of the present invention are not impaired in addition to the components describes above.

(3) Optional Configurations

The adhesive sheet of one or more embodiments of the present invention has at least the thermally expandable thermosetting adhesive layers A and B and may have optional configurations as needed. The adhesive sheet of one or more embodiments of the present invention may be a mode in which the thermally expandable thermosetting adhesive layer B is laminated directly on one face of the thermally expandable thermosetting adhesive layer A as illustrated in FIGS. 1A-1B described above or may have the intermediate layer interposed between the thermally expandable thermosetting adhesive layer A and the thermally expandable thermosetting adhesive layer B, in which a first face of the intermediate layer and the thermally expandable thermosetting adhesive layer A may be in contact with each other and a second face of the intermediate layer and the thermally expandable thermosetting adhesive layer B may be in contact with each other as illustrated in FIGS. 2A-2B.

The intermediate layer is preferably a base having heat resistance. The level of heat resistance, which varies by uses, is, in terms of melting point, preferably 150° C. or higher, more preferably 200° C. or higher, and further preferably 250° C. or higher.

The melting point refers to a temperature indicating a maximum endothermic peak observed when the temperature of the base is raised on a temperature rising condition with a temperature rising rate of 10° C./minute from 30° C. using a differential scanning calorimeter (DSC).

Specific examples of the base having heat resistance include polybutylene terephthalate, polyethylene naphthalate (PEN), polyamide, polyimide, polyetherimide, polysulfone, polyetherketone (PEEK), polyphenylene sulfide (PPS), and modified polyphenylene oxide.

The intermediate layer preferably has a thickness of 1 μm or more and 200 μm or less, more preferably has a thickness of 2 μm or more and 150 μm or less, and further preferably has a thickness of 3 μm or more and 100 μm or less. This is because by setting the thickness of the intermediate layer to the above range, when bonding the face of the adhesive sheet of one or more embodiments of the present invention on the thermally expandable thermosetting adhesive layer A side to an adherend such as the member to be inserted or the inserted member, the face sufficiently follows the surface shape of the adherend even if the surface of the adherend is rough or uneven, and excellent adhesiveness is obtained. The intermediate layer may include a single layer of the base having heat resistance or two or more layers including the same or different bases having heat resistance laminated on each other.

The adhesive sheet of one or more embodiments of the present invention may have a release liner on the face of the thermally expandable thermosetting adhesive layer A opposite to the thermally expandable thermosetting adhesive layer B. Similarly, the adhesive sheet of one or more embodiments of the present invention may have a release liner on the face of the thermally expandable thermosetting adhesive layer B opposite to the thermally expandable thermosetting adhesive layer A. For the release liner, known ones such as resin films can be used.

(4) Others

The adhesive sheet of one or more embodiments of the present invention has a total thickness before heating (before expansion) of preferably 10 μm or more and 600 μm or less, especially preferably 50 μm or more and 500 μm or less, and further preferably 100 μm or more and 400 μm or less. The total thickness after heating (after expansion) is preferably 20 μm or more and 2,500 μm or less, especially preferably 40 μm or more and 2,000 μm or less, and further preferably 100 μm or more and 1,000 μm or less. The total thickness of the adhesive sheet shall not include the thickness of the release liner.

The adhesive sheet of one or more embodiments of the present invention has a shear adhesive strength after expansion (after heating) under a room temperature (23° C.) environment of preferably 3 MPa or more, further preferably 6 MPa or more, and more preferably 9 MPa or more. This is because it has excellent adhesion retention performance to the member to be inserted and the inserted member. The shear adhesive strength after expansion (after heating) under a 150° C. environment is preferably 1 MPa or more, further preferably 4 MPa or more, and more preferably 7 MPa or more. This is because it has excellent adhesion retention performance to the member to be inserted and the inserted member and can exhibit higher retention performance even in high temperature environments. Higher shear adhesive strengths after expansion (after heating) under room temperature and 150° C. environments are more preferred, which are not limited to particular values and can be 15 MPa or less, for example. The shear adhesive strength of the adhesive sheet of one or more embodiments of the present invention after expansion (after heating) is measured by the method described in examples described below.

The adhesive sheet of one or more embodiments of the present invention can be produced through a step of forming the thermally expandable thermosetting adhesive layer A by applying the thermally expandable thermosetting adhesive composition a to a release liner and drying it, a step of forming the thermally expandable thermosetting adhesive layer B by applying the thermally expandable thermosetting adhesive composition b to another release liner and drying it, and a step of transferring the thermally expandable thermosetting adhesive layer A to one face of the thermally expandable thermosetting adhesive layer B and pressure bonding them together, for example.

The adhesive sheet of one or more embodiments of the present invention having the intermediate layer can be produced through a step of forming the thermally expandable thermosetting adhesive layer A by applying the thermally expandable thermosetting adhesive composition a to a release liner and drying it, a step of forming the thermally expandable thermosetting adhesive layer B by applying the thermally expandable thermosetting adhesive composition b to another release liner and drying it, a step of bonding the intermediate layer to the thermally expandable thermosetting adhesive layer A, and a step of bonding the thermally expandable thermosetting adhesive layer B to the face of the intermediate layer opposite to the thermally expandable thermosetting adhesive layer A, for example.

The adhesive sheet of one or more embodiments of the present invention is useful in uses in which it is used between two members to fill a cavity between the two members and to bond the members together. In particular, the adhesive sheet of one or more embodiments of the present invention is particularly useful for filling and bonding between members becoming high temperatures and members exposed to high temperature environments, such as magnets in motors installed in hybrid cars and core members of motors because the thermally expandable thermosetting adhesive layers A and B expand and cure by heating and can thus sufficiently fill the cavity, and in addition, the thermally expandable thermosetting adhesive layers A and B after expansion can each maintain high adhesive strength even under high temperature environments.

The adhesive sheet of one or more embodiments of the present invention is not limited to the use of the bonding between the member to be inserted and the inserted member and can be used for the use of simply bonding two members together and the use of filling a cavity of an adherend. By placing the adhesive sheet of one or more embodiments of the present invention in a cavity of an adherend and then expanding it, it can also be used when a configuration in which two or more locations in the cavity are bonded together by the adhesive sheet is formed, for example.

II. Article

One aspect of the article of one or more embodiments of the present invention includes a first adherend and a second adherend, the second adherend being formed with a cavity, the first adherend being disposed in the cavity of the second adherend, an expanded product of the adhesive sheet described in the section "I. Adhesive Sheet" being disposed between the first adherend and the second adherend in the cavity, and one of the first adherend and the second adherend being bonded to an expanded product of the thermally expandable thermosetting adhesive layer A and another of the first adherend and the second adherend being bonded to an expanded product of the thermally expandable thermosetting adhesive layer B.

With the article of the present aspect, the expanded products (cured products) of the thermally expandable thermosetting adhesive layers A and B of the adhesive sheet described in the section "I. Adhesive Sheet" described above are filled between the first adherend and the second adherend in the cavity of the second adherend, and the first adherend and the second adherend are bonded together through the expanded products (cured products) of the thermally expandable thermosetting adhesive layers A and B, and thus it can maintain high adhesive strength even under high temperature environments and have high heat resistance.

In the article of the present aspect, in view of the capability of easily producing the article regardless of the width and size of the cavity by inserting the first adherend with the adhesive sheet bonded thereto into the cavity of the second adherend, the first adherend is preferably bonded to the expanded product of the thermally expandable thermosetting adhesive layer A, while the second adherend is preferably bonded to the expanded product of the thermally expandable thermosetting adhesive layer B.

Another aspect of one or more embodiments of the article of the present invention includes a first adherend, a third adherend, and a fourth adherend and has a cavity between the third adherend and the fourth adherend, the first adherend being disposed in the cavity, an expanded product of the adhesive sheet described in the section "I. Adhesive Sheet" being disposed between the first adherend and the third adherend and between the first adherend and the fourth adherend each in the cavity, and at least one of the first adherend, and the third adherend and the fourth adherend being bonded to an expanded product of the thermally expandable thermosetting adhesive layer A and another of the first adherend, and the third adherend and the fourth adherend being bonded to an expanded product of the thermally expandable thermosetting adhesive layer B.

With the article of the present aspect, in the cavity provided between the third adherend and the fourth adherend, the expanded products of the thermally expandable thermosetting adhesive layers A and B of the adhesive sheet described in the section "I. Adhesive Sheet" described above are filled each between the first adherend and the third adherend and between the first adherend and the fourth adherend, and the first adherend and the third adherend and the first adherend and the fourth adherend are each bonded together through the expanded products of the thermally expandable thermosetting adhesive layers A and B, and thus it can maintain high adhesive strength even under high temperature environments.

In the article of the present aspect, in view of ease of production of the article capable of easily producing the article regardless of the width and size of the cavity by inserting the first adherend with the adhesive sheet bonded thereto into the cavity, the first adherend is preferably bonded to the expanded product of the thermally expandable thermosetting adhesive layer A, while the third adherend and the fourth adherend are preferably bonded to the expanded product of the thermally expandable thermosetting adhesive layer B.

The article of one or more embodiments of the present invention is not limited to a particular article because the type of each adherend can be selected as appropriate, and examples thereof include motors for use in automobiles, consumer appliances, robots, and the like.

The article of one or more embodiments of the present invention can be produced by the method for producing an article described below, for example.

III. Method for Producing Article

The method for producing an article of one or more embodiments of the present invention is a method of production bonding two members together through an expanded product of the adhesive sheet described in the section "I. Adhesive Sheet" described above and, in particular, a method of production bonding an inserted member having a cavity and a member to be inserted disposed in the cavity together through an expanded product of the adhesive sheet described in the section "I. Adhesive Sheet" described above.

One aspect of the method for producing an article of one or more embodiments of the present invention includes a step [1A] of bonding the first face of the adhesive sheet described in the section "I. Adhesive Sheet" to a surface of a first adherend or a surface of a cavity formed in a second adherend, a step [2A] of inserting the first adherend into the cavity, and a step [3A] of heating the adhesive sheet to expand and cure the thermally expandable thermosetting adhesive layer A and the thermally expandable thermosetting adhesive layer B and to bond the first adherend and the second adherend together through an expanded product of the adhesive sheet.

Figure 3B:
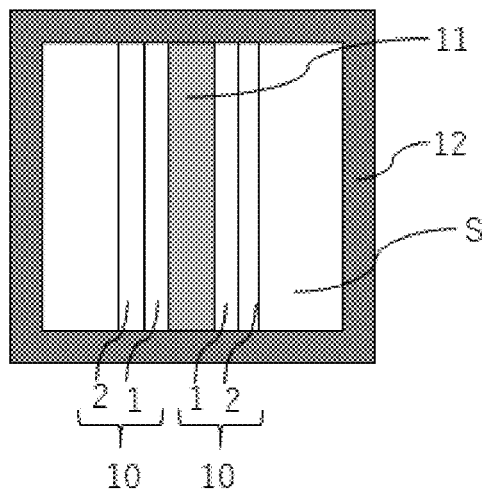
Figure 3C:
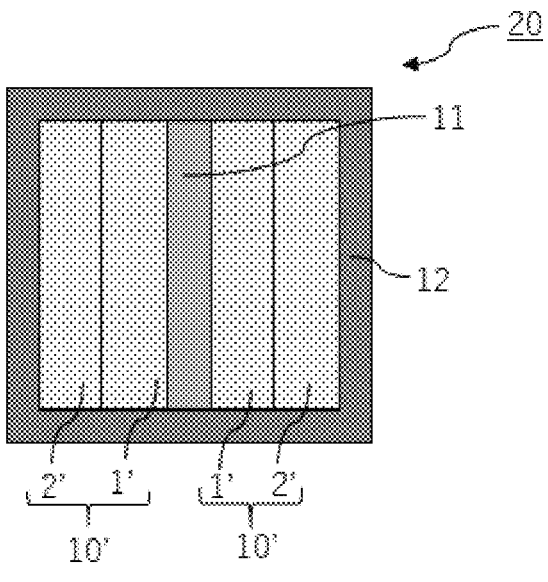

As illustrated in FIGS. 3A-3C, first, the first face of the adhesive sheet 10 described in the section "I. Adhesive Sheet," that is, the thermally expandable thermosetting adhesive layer A of the adhesive sheet 10 (the symbol 1 in FIG. 3A) is bonded to either face of a first adherend 11 (FIG. 3A, the step [1A]). Next, the first adherend 11 to which the adhesive sheet 10 is bonded is inserted into a cavity S formed in a second adherend 12 (FIG. 3B, the step [2A]). Subsequently, the adhesive sheet 10 is heated to expand and cure the thermally expandable thermosetting adhesive layer A and the thermally expandable thermosetting adhesive layer B (the symbols 1 and 2 in FIG. 3C). In this process, the cavity S is filled with an expanded product 1' of the thermally expandable thermosetting adhesive layer A and an expanded product 2' of the thermally expandable thermosetting adhesive layer B, and the second face of the adhesive sheet 10' after expansion, that is, the surface of the expanded product 2' of the thermally expandable thermosetting adhesive layer B and the cavity surface of the second adherend 12 come into contact with each other to be bonded together. This procedure produces an article 20 in which the first adherend 11 and the second adherend 12 are bonded together through the expanded product 10' of the adhesive sheet (FIG. 3C, the step [3A]).

Another aspect of the method for producing an article of one or more embodiments of the present invention includes a step [1B] of bonding the first face of the adhesive sheet described in the section "I. Adhesive Sheet" to a surface of a first adherend or a surface of a cavity formed by a third adherend and a fourth adherend, a step [2B] of inserting the first adherend into the cavity, and a step [3B] of heating the adhesive sheet to expand and cure the thermally expandable thermosetting adhesive layer A and the thermally expandable thermosetting adhesive layer B and to bond the first adherend, and the third adherend and the fourth adherend together through an expanded product of the adhesive sheet.

Figure 4A:
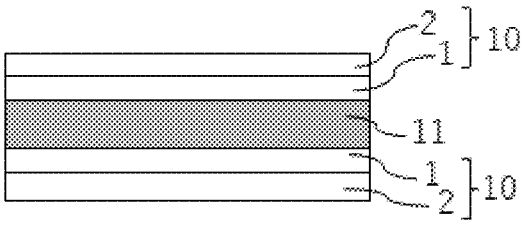
FIGS. 4A-4C are procedure diagrams of an example of the method for producing an article of one or more embodiments of the present invention.
Figure 4B:
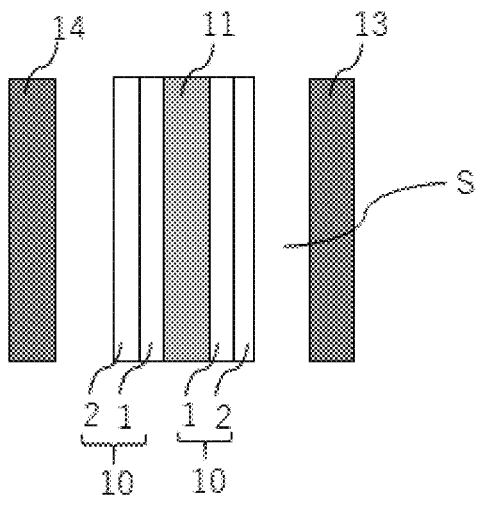
Figure 4C:
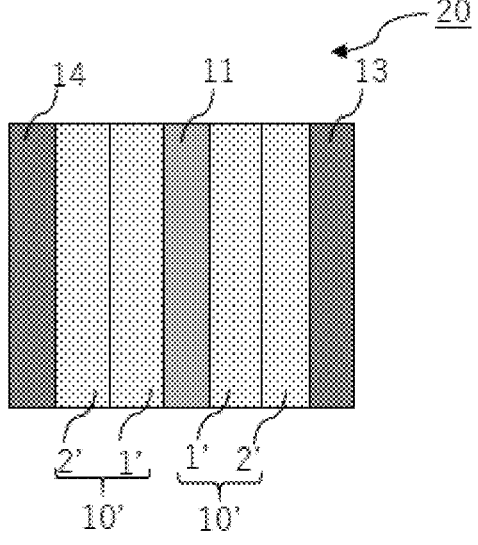

As illustrated in FIGS. 4A-4C, first, the first face of the adhesive sheet 10 described in the section "I. Adhesive Sheet," that is, the surface of the thermally expandable thermosetting adhesive layer A (the symbol 1 in FIG. 4A) is bonded to either face of the first adherend 11 (FIG. 4A, the step [1B]). Next, the first adherend 11 to which the adhesive sheet 10 is bonded is inserted into a cavity S formed by a third adherend 13 and a fourth adherend 14 (FIG. 4B, the step [2B]). Subsequently, the adhesive sheet 10 is heated to expand and cure the thermally expandable thermosetting adhesive layer A and the thermally expandable thermosetting adhesive layer B (the symbols 1 and 2 in FIG. 4C). In this process, the cavity S is filled with an expanded product of the thermally expandable thermosetting adhesive layer A (the symbol 1' in FIG. 4C) and an expanded product of the thermally expandable thermosetting adhesive layer B (the symbol 2' in FIG. 4C), and the second face of the adhesive sheet 10' after expansion, that is, the surface of the expanded product 2' of the thermally expandable thermosetting adhesive layer B and the face of the third adherend 13 forming the cavity and the surface of the fourth adherend 14 forming the cavity come into contact with each other to be bonded together. This procedure produces an article 20 in which one face of the first adherend 11 and the third adherend 13 are bonded together and the other face of the first adherend 11 and the fourth adherend 14 are bonded together (FIG. 4C, the step [3B]).

With the method for producing an article of one or more embodiments of the present invention, when inserting the first adherend, which is the member to be inserted, into the cavity of the second adherend or the cavity formed by the third adherend and the fourth adherend, which is the inserted member, the first face of the adhesive sheet is bonded to a desired adherend, and thereby the occurrence of deviation of the bonding position of the adhesive sheet during insertion can be prevented, and the second face of the adhesive sheet is exposed, thus preventing insertion inhibition caused by the stickiness of the surface of the adhesive sheet and positional deviation of the adhesive sheet caused by adhering to another adherend. Furthermore, the adhesive sheet after heating can maintain high adhesive strength even at high temperatures, and thus components with high heat resistance can be produced.

The first adherend corresponds to the member to be inserted. The second adherend formed with the cavity and the third adherend and the fourth adherend forming the cavity correspond to the inserted member. Examples of the cavity in the second adherend include holes, grooves, and openings formed in the adherend. Examples of the cavity between the third adherend and the fourth adherend include separation spaces between the third adherend and the fourth adherend that are disposed spaced apart from each other and holes, grooves, and openings formed by the third adherend and the fourth adherend.

In the steps [1A] and [1B], the first face of the adhesive sheet (the face on the thermally expandable thermosetting adhesive layer A side) is bonded to one surface of the adherend, which is the member to be inserted (insertion member) or the inserted member. In FIGS. 3A-3C and FIGS. 4A-4C, in the steps [1A] and [1B], the first face of the adhesive sheet is bonded to either face (two opposite faces) of the first adherend, but the first face of the adhesive sheet may be bonded to at least one face of the first adherend, or the first face of the adhesive sheet may be bonded to three or more faces thereof.

In the steps [1A] and [1B], the first face of the adhesive sheet may be bonded to the first adherend, and in the case of the step [1A], the first face of the adhesive sheet may be bonded to the surface of the cavity formed in the second adherend, while in the case of the step [1B], it may be bonded to the surface of the cavity formed by the third adherend and the fourth adherend. In this case, the first face of the adhesive sheet may be bonded to one face of the surface of the cavity, or the first face of the adhesive sheet may be bonded to two or more faces.

When bonding the first face of the adhesive sheet to two or more faces of the surface of the adherend, a single adhesive sheet may be continuously bonded to a plurality of faces of the adherend, or each adhesive sheet may be bonded to each face of the adherend. When bonding the adhesive sheet to the first adherend, for example, the first faces of separate adhesive sheets may be bonded to two respective opposite faces of the first adherend to hold the first adherend by the two adhesive sheets, or a single adhesive sheet may be bonded to a plurality of surfaces of the first adherend so as to cover them. Similarly, when bonding the adhesive sheet to the surface of the cavity formed in the second adherend or the cavity formed by the third adherend and the fourth adherend (the surface of the adherend), the first faces of separate adhesive sheets may be bonded to two respective opposite faces of the surface of the cavity, or a single adhesive sheet may be bonded to a plurality of surfaces of the cavity so as to cover them.

The conditions for bonding the first face of the adhesive sheet (the face on the thermally expandable thermosetting adhesive layer A side) to the surface of the adherend are not limited to particular conditions, and bonding is preferably performed in a range of room temperature (23° C.) to 40° C., for example, and bonding is more preferably performed at room temperature (23° C.). Performing bonding at room temperature (23° C.) is preferred in view of the capability of easily performing bonding using the initial adhesiveness of the thermally expandable thermosetting adhesive layer A and maintaining the initial adhesiveness of the thermally expandable thermosetting adhesive layer B.

In the step [2A], the first adherend is inserted into the cavity formed in the second adherend. In the step [2B], the first adherend is inserted into the cavity between the third adherend and the fourth adherend. In the steps [2A] and [2B], the adhesive sheet having been bonded to the adherend has the second face (the face on the thermally expandable thermosetting adhesive layer B side) positioned on the outermost surface, and thus when the adhesive sheet is bonded to the first adherend, insertion is made possible without causing the adhesive sheet to adhere to the cavity surface, and even if it adheres thereto, it is difficult for the adhesive sheet to peel off by the force received during insertion, and thus the temporary fixability can be maintained, which improves the insertability. Similarly, when the adhesive sheet is bonded to the cavity surface, insertion is made possible without causing the adhesive sheet to adhere to the first adherend, and even if it adheres thereto, it is difficult for the adhesive sheet to peel off by the force received during insertion, and thus the temporary fixability can be maintained, which improves the insertability.

In the steps [3A] and [3B], with the first adherend inserted into the cavity, the adhesive sheet is heated to expand and cure the thermally expandable thermosetting adhesive layer A and the thermally expandable thermosetting adhesive layer B. Heating may be applied directly to the thermally expandable thermosetting adhesive layer A and the thermally expandable thermosetting adhesive layer B of the adhesive sheet or applied to the whole including the adherend. The method of heating may be either a non-contact type or a contact type, and examples of the method of heating include hot air heating, heating by contact with an electric heater, heating by light application such as an infrared heater and a halogen heater, dielectric heating, and induction heating.

The heating temperature in the steps [3A] and [3B] can be set to a temperature at which the thermally expandable thermosetting adhesive layer A and the thermally expandable thermosetting adhesive layer B can expand and cure. In particular, the temperature is preferably a temperature corresponding to the curing of the thermally expandable thermosetting adhesive layers A and B and the expansion temperature of the expansion agent (an expansion starting temperature) and is preferably the expansion temperature of the expansion agent or higher. Specifically, the temperature is preferably 80° C. to 350° C., further preferably 100° C. to 250° C., and more preferably 150° C. to 200° C.

The heating time in the steps [3A] and [3B] can be set to a time in which the thermally expandable thermosetting adhesive layer A and the thermally expandable thermosetting adhesive layer B can expand and cure and is preferably an expansion time or more. Specifically, the heating time is preferably 5 minutes to 300 minutes, more preferably 10 minutes to 200 minutes, and further preferably 20 minutes to 100 minutes. Setting the above heating time can suitably perform inhibition of thermal damage to the adherend and firm bonding of the members.

In the steps [3A] and [3B], the cavity is filled by the adhesive sheet expanding by heating in the cavity, and in the case of the step [3A], the first adherend and the second adherend are bonded together through the expanded product of the adhesive sheet, while in the case of the step [3B], the first adherend, and the third adherend and the fourth adherend are bonded together.

In the cavity, the adhesive sheet expands by heating, thereby enabling the expanded product of the thermally expandable thermosetting adhesive layer B to come into contact with the adherend to which the adhesive sheet is not provided. In this process, both the expanded products of the thermally expandable thermosetting adhesive layers A and B develop adhesive strength by heat curing, and thus the first adherend, which is the member to be inserted, and the second adherend or the third adherend and the fourth adherend, which are the inserted member, can be firmly bonded together. In addition, the expanded products of the thermally adhesive thermosetting adhesive layers A and B are cured products and have high heat resistance and can thus maintain high adhesive strength in high temperature environments.

The article to be obtained by the method for producing an article of one or more embodiments of the present invention is not limited to a particular article, and examples thereof include motors installed in hybrid cars and the like. Specifically, the motor can be produced by bonding the thermally expandable thermosetting adhesive layer A of the adhesive sheet and part of a component such as a magnet together in advance, inserting and placing the component to which the adhesive sheet is bonded into a cavity of a core member forming the motor, and then heating and expanding the thermally expandable thermosetting adhesive layers A and B. Thus, the method for producing an article of one or more embodiments of the present invention is useful as a method for producing a motor.

The present disclosure is not limited to the above embodiments. The above embodiments are by way of example, and any embodiment that has substantially the same configuration as the technical concept described in the claims of the present disclosure and produces similar effects is included in the technical scope of the present disclosure.

EXAMPLES

The following specifically describes one or more embodiments of the present invention with examples.

Preparation Example 1

<Preparation of Thermally Expandable Thermosetting Adhesive Composition (a-1)>

Blended were 40 parts by mass of an epoxy resin 1 (BPA type, epoxy equivalent weight 8,000 g/eq., solid (25° C.), softening point 200° C. or higher), 35 parts by mass of an epoxy resin 2 (BPA type, epoxy equivalent weight 188 g/eq., 11,000 mPa-s (25° C.)), and 25 parts by mass of an epoxy resin 3 (dicyclopentadiene type, epoxy equivalent weight 280 g/eq., solid (25° C.), softening point 100° C.) to prepare a thermosetting resin composition (a-1). The total epoxy equivalent weight of the thermosetting resin composition (a-1) was 357 g/eq. Next, dissolved in 60 parts by mass of methyl ethyl ketone were 4.7 parts by mass of a curing agent 1 (dicyandiamide, solid), 3 parts by mass of a curing agent 2 (2,4-diamino-6-[2'-methylimidazolyl-(1')]-ethyl-s-triazine isocyanuric acid adduct, solid), and 1 part by mass of an expansion agent 1 (thermally expandable capsules, expansion starting temperature 125° C., average particle diameter 13 μm) to prepare a solution-like thermally expandable thermosetting adhesive composition (a-1).

Preparation Example 2

<Preparation of Thermally Expandable Thermosetting Adhesive Composition (a-2)>

A thermosetting resin composition (a-2) and a solution-like thermally expandable thermosetting adhesive composition (a-2) were prepared in the same manner as in Preparation Example 1 except that the amount of use of the epoxy resin 1 was changed from 40 parts by mass to 30 parts by mass, 30 parts by mass of an epoxy resin 4 (modified BPA type, epoxy equivalent weight 400 g/eq., 1,400,000 mPa-s (25° C.)) was used instead of the epoxy resin 2, 40 parts by mass of an epoxy resin 5 (modified novolac type, epoxy equivalent weight 160 g/eq., semi-solid (25° C.)) was used instead of the epoxy resin 3, and the amount of use of the curing agent 1 was changed from 4.7 parts by mass to 5.7 parts by mass. The total epoxy equivalent weight of the thermosetting resin composition (a-2) was 304 g/eq.

Preparation Example 3

<Preparation of Thermally Expandable Thermosetting Adhesive Composition (b-1)>

A thermosetting resin composition (b-1) and a solution-like thermally expandable thermosetting adhesive composition (b-1) were prepared in the same manner as in Preparation Example 1 except that the amount of use of the epoxy resin 1 was changed from 40 parts by mass to 35 parts by mass, the amount of use of the epoxy resin 2 was changed from 35 parts by mass to 7 parts by mass, the amount of use of the epoxy resin 3 was changed from 25 parts by mass to 58 parts by mass, and the amount of use of the curing agent 1 was changed from 4.7 parts by mass to 4.1 parts by mass. The total epoxy equivalent weight of the thermosetting resin composition (b-1) was 402 g/eq.

Preparation Example 4

<Preparation of Thermally Expandable Thermosetting Adhesive Composition (b-2)>

A thermosetting resin composition (b-2) and a solution-like thermally expandable thermosetting adhesive composition (b-2) were prepared in the same manner as in Preparation Example 1 except that the amount of use of the epoxy resin 1 was changed from 40 parts by mass to 35 parts by mass, the amount of use of the epoxy resin 2 was changed from 35 parts by mass to 15 parts by mass, the amount of use of the epoxy resin 3 was changed from 25 parts by mass to 50 parts by mass, and the amount of use of the curing agent 1 was changed from 4.7 parts by mass to 4.6 parts by mass. The total epoxy equivalent weight of the thermosetting resin composition (b-2) was 381 g/eq.

Preparation Example 5

<Preparation of Thermally Expandable Thermosetting Adhesive Composition (b-3)>

A thermosetting resin composition (b-3) and a solution-like thermally expandable thermosetting adhesive composition (b-3) were prepared in the same manner as in Preparation Example 1 except that the amount of use of the epoxy resin 1 was changed from 40 parts by mass to 35 parts by mass, 7 parts by mass of the epoxy resin 4 was used instead of the epoxy resin 2, 58 parts by mass of the epoxy resin 5 was used instead of the epoxy resin 3, and the amount of use of the curing agent 1 was changed from 4.7 parts by mass to 4.4 parts by mass. The total epoxy equivalent weight of the thermosetting resin composition (b-3) was 260 g/eq.

Preparation Example 6

<Preparation of Thermosetting Adhesive Composition (b'-1)

A thermosetting resin composition (b'-1) and a solution-like thermosetting adhesive composition (b'-1) were prepared in the same manner as in Preparation Example 3 except than the amount of use of the expansion agent 1 was changed from 1 part by mass to 0 part by mass. The total epoxy equivalent weight of the thermosetting resin composition (b'-1) was 402 g/eq.

Example 1

The thermally expandable thermosetting adhesive composition (a-1) obtained in Preparation Example 1 was applied to the surface of a release liner (a 50-μm-thick polyethylene terephthalate film with one face subjected to releasing treatment with a silicone compound) so as to give a thickness after drying of 62 μm using a rod-shaped metal applicator. The obtained applied object was put in a dryer at 85° C. for 5 minutes to dry it and to obtain a 62-μm-thick sheet-shaped thermally expandable thermosetting adhesive layer (A-1).

A 25-μm-thick polyimide film was overlaid on the surface of the thermally expandable thermosetting adhesive layer (A-1) obtained above and was bonded thereto at a linear pressure of 3 N/mm with a laminator under 23° C. to obtain a laminate with the polyimide film laminated on one face of the thermally expandable thermosetting adhesive layer (A-1).

Next, the thermally expandable thermosetting adhesive composition (b-1) obtained in Preparation Example 3 was applied to the surface of the release liner so as to give a thickness after drying of 62 μm using a rod-shaped metal applicator. The obtained applied object was put in a dryer at 85° C. for 5 minutes to dry it and to obtain a 62-μm-thick sheet-shaped thermally expandable thermosetting adhesive layer (B-1).

The thermally expandable thermosetting adhesive layer (B-1) was overlaid on the polyimide film face side of the laminate with the polyimide film laminated on one face of the thermally expandable thermosetting adhesive layer (A-1) and was bonded thereto at a linear pressure of 3 N/mm with a laminator preheated to 50° C. to obtain an adhesive sheet (X-1) with a thickness of 149 μm (excluding the thickness of the release liner. The same applies hereinafter). For the adhesive sheet (X-1), the face side of the thermally expandable thermosetting adhesive layer (A-1) was defined as the first face side of the adhesive sheet, while the face side of the thermally expandable thermosetting adhesive layer (B-1) was defined as the second face side of the adhesive sheet. The shear adhesive strengths of the first face and the second face of the adhesive sheet (X-1) and the shear adhesive strengths of the thermally expandable thermosetting adhesive layer (A-1) and the thermally expandable thermosetting adhesive layer (B-1) were the values listed in Table 1 below. The glass transition temperature of the thermally expandable thermosetting adhesive layer (A-1) after curing (after expansion) in the adhesive sheet (X-1) after heating at 150° C. for 60 minutes was 132° C., while the glass transition temperature of the thermally expandable thermosetting adhesive layer (B-1) was 165° C. The glass transition temperature was measured by the method described in the section "I. Adhesive Sheet" described above. The same shall apply to the following examples and comparative examples.

The shear adhesive strengths of the first face and the second face of the adhesive sheet and the shear adhesive strengths of the respective thermally expandable thermosetting adhesive layers were measured by the method described below. The same applies to the other examples and comparative examples.

Example 2

An adhesive sheet (X-2) was obtained in the same manner as in Example 1 except that a thermally expandable thermosetting adhesive layer (B-2) was produced using the thermally expandable thermosetting adhesive composition (b-2) instead of the thermally expandable thermosetting adhesive composition (b-1), and the thermally expandable thermosetting adhesive layer (B-2) was used instead of the thermally expandable thermosetting adhesive layer (B-1). For the adhesive sheet (X-2), the face side of the thermally expandable thermosetting adhesive layer (A-1) was defined as the first face side of the adhesive sheet, while the face side of the thermally expandable thermosetting adhesive layer (B-2) was defined as the second face side of the adhesive sheet. The shear adhesive strengths of the first face and the second face of the adhesive sheet (X-2) and the shear adhesive strengths of the thermally expandable thermosetting adhesive layer (A-1) and the thermally expandable thermosetting adhesive layer (B-2) were the values listed in Table 1 below. The glass transition temperature of the thermally expandable thermosetting adhesive layer (A-1) after curing (after expansion) in the adhesive sheet (X-2) after heating at 150° C. for 60 minutes was 132° C., while the glass transition temperature of the thermally expandable thermosetting adhesive layer (B-2) was 153° C.

Example 3

An adhesive sheet (X-3) was obtained in the same manner as in Example 1 except that a thermally expandable thermosetting adhesive layer (A-2) was produced using the thermally expandable thermosetting adhesive composition (a-2) instead of the thermally expandable thermosetting adhesive composition (a-1), a thermally expandable thermosetting adhesive layer (B-3) was produced using the thermally expandable thermosetting adhesive composition (b-3) instead of the thermally expandable thermosetting adhesive composition (b-1), the thermally expandable thermosetting adhesive layer (A-2) was used instead of the thermally expandable thermosetting adhesive layer (A-1), and the thermally expandable thermosetting adhesive layer (B-3) was used instead of the thermally expandable thermosetting adhesive layer (B-1). For the adhesive sheet (X-3), the face side of the thermally expandable thermosetting adhesive layer (A-2) was defined as the first face side of the adhesive sheet, while the face side of the thermally expandable thermosetting adhesive layer (B-3) was defined as the second face side of the adhesive sheet. The shear adhesive strengths of the first face and the second face of the adhesive sheet (X-3) and the shear adhesive strengths of the thermally expandable thermosetting adhesive layer (A-2) and the thermally expandable thermosetting adhesive layer (B-3) were the values listed in Table 1 below. The glass transition temperature of the thermally expandable thermosetting adhesive layer (A-2) after curing (after expansion) in the adhesive sheet (X-3) after heating at 150° C. for 60 minutes was 125° C., while the glass transition temperature of the thermally expandable thermosetting adhesive layer (B-3) was 159° C.

Example 4

The thermally expandable thermosetting adhesive composition (a-1) obtained in Preparation Example 1 was applied to the surface of a release liner (a 50-μm-thick polyethylene terephthalate film with one face subjected to releasing treatment with a silicone compound) so as to give a thickness after drying of 75 μm using a rod-shaped metal applicator. The obtained applied object was put in a dryer at 85° C. for 5 minutes to dry it and to obtain a 75-μm-thick sheet-shaped thermally expandable thermosetting adhesive layer (A-4).

Next, the thermally expandable thermosetting adhesive composition (b-1) obtained in Preparation Example 3 was applied to the surface of the release liner so as to give a thickness after drying of 75 μm using a rod-shaped metal applicator. The obtained applied object was put in a dryer at 85° C. for 5 minutes to dry it and to obtain a 75-μm-thick sheet-shaped thermally expandable thermosetting adhesive layer (B-4).

The thermally expandable thermosetting adhesive layer (B-4) was overlaid on the adhesive layer side of the thermally expandable thermosetting adhesive layer (A-4) and was bonded thereto at a linear pressure of 3 N/mm with a laminator preheated to 50° C. to obtain a 150-μm-thick adhesive sheet (X-4). For the adhesive sheet (X-4), the face side of the thermally expandable thermosetting adhesive layer (A-4) was defined as the first face side of the adhesive sheet, while the face side of the thermally expandable thermosetting adhesive layer (B-4) was defined as the second face side of the adhesive sheet. The shear adhesive strengths of the first face and the second face of the adhesive sheet (X-4) and the shear adhesive strengths of the thermally expandable thermosetting adhesive layer (A-4) and the thermally expandable thermosetting adhesive layer (B-4) were the values listed in Table 1 below. The glass transition temperature of the thermally expandable thermosetting adhesive layer (A-4) after curing (after expansion) in the adhesive sheet (X-4) after heating at 150° C. for 60 minutes was 132° C., while the glass transition temperature of the thermally expandable thermosetting adhesive layer (B-4) was 165° C.

Comparative Example 1

An adhesive sheet (X'-1) was obtained in the same manner as in Example 1 except that the thermally expandable thermosetting adhesive layer (A-1) was used instead of the thermally expandable thermosetting adhesive layer (B-1). For the adhesive sheet (X'-1), one face side of the thermally expandable thermosetting adhesive layer (A-1) freely selected was defined as the first face side of the adhesive sheet, while the other face side of the thermally expandable thermosetting adhesive layer (A-1) was defined as the second face side of the adhesive sheet. The shear adhesive strengths of the first face and the second face of the adhesive sheet (X'-1) and the shear adhesive strength of the thermally expandable thermosetting adhesive layer (A-1) were the values listed in Table 1 below. Both the glass transition temperatures of the thermally expandable thermosetting adhesive layers (A-1) after curing (after expansion) in the adhesive sheet (X'-1) after heating at 150° C. for 60 minutes were the same as the glass transition temperature of the thermally expandable thermosetting adhesive layer (A-1) after curing (after expansion) in the adhesive sheet (X-1) of Example 1.

Comparative Example 2

An adhesive sheet (X'-2) was obtained in the same manner as in Example 1 except that the thermally expandable thermosetting adhesive layer (B-1) was used instead of the thermally expandable thermosetting adhesive layer (A-1). For the adhesive sheet (X'-2), one face side of the thermally expandable thermosetting adhesive layer (B-1) freely selected was defined as the first face side of the adhesive sheet, while the other face side of the thermally expandable thermosetting adhesive layer (B-1) was defined as the second face side of the adhesive sheet. The shear adhesive strengths of the first face and the second face of the adhesive sheet (X'-2) and the shear adhesive strength of the thermally expandable thermosetting adhesive layer (B-1) were the values listed in Table 1 below. Both the glass transition temperatures of the thermally expandable thermosetting adhesive layers (B-1) after curing (after expansion) in the adhesive sheet (X'-2) after heating at 150° C. for 60 minutes were the same as the glass transition temperature of the thermally expandable thermosetting adhesive layer (B-1) after curing (after expansion) in the adhesive sheet (X-1) of Example 1.

Comparative Example 3

An adhesive sheet (X'-3) was obtained in the same manner as in Example 1 except that a thermosetting adhesive layer (B'-1) was produced using the thermosetting adhesive composition (b'-1) instead of the thermally expandable thermosetting adhesive composition (b-1), and the thermosetting adhesive layer (B'-1) was used instead of the thermally expandable thermosetting adhesive layer (B-1). For the adhesive sheet (X'-3), the face side of the thermally expandable thermosetting adhesive layer (A-1) was defined as the first face side of the adhesive sheet, while the face side of the thermosetting adhesive layer (B'-1) was defined as the second face side of the adhesive sheet. The shear adhesive strengths of the first face and the second face of the adhesive sheet (X'-3) and the shear adhesive strengths of the thermally expandable thermosetting adhesive layers (A-1) and the thermosetting adhesive layer (B'-1) were the values listed in Table 1 below. The glass transition temperature of the thermally expandable thermosetting adhesive layer (A-1) after curing (after expansion) in the adhesive sheet (X'-3) after heating at 150° C. for 60 minutes was the same as the glass transition temperature of the thermally expandable thermosetting adhesive layer (A-1) after curing (after expansion) in the adhesive sheet (X-1) of Example 1, while the glass transition temperature of the thermosetting adhesive layer (B'-1) after curing (after expansion) was 165° C.

[Evaluation 1: Measurement of Expansion Rate]

The thermally expandable thermosetting adhesive layers (A-1) and (A-2) and (B-1) to (B-3) and the thermosetting adhesive layer (B'-1) on the release liner used when producing the adhesive sheets of the examples and the comparative examples were used as test samples. The thicknesses of the thermally expandable thermosetting adhesive layers and the thermosetting adhesive layer of the test samples before heating were measured using a thickness meter. Next, the test samples were heated at 150° C. for 60 minutes, and the thicknesses of the thermally expandable thermosetting adhesive layers and the thermosetting adhesive layer after heating were measured using a thickness meter. The expansion rate was calculated in accordance with the following equation.

Expansion rate [%]=thickness [μm] of thermally expandable thermosetting adhesive layer after heating/thickness [μm] of thermally expandable thermosetting adhesive layer before heating× 100[%]

[Evaluation 2: Measurement of Shear Adhesive Strength Before Heating]

(Evaluation 2-1: Measurement of Shear Adhesive Strength of Thermally Expandable Thermosetting Adhesive Layer Before Heating)

The thermally expandable thermosetting adhesive layers (A-1) and (A-2) and (B-1) to (B-3) and the thermosetting adhesive layer (B'-1) on the release liner used when producing the adhesive sheets of the examples and the comparative examples were cut into a size of 10 mm×10 mm, which were used as test samples. Two smooth-surfaced aluminum plates (15 mm wide×70 mm long×0.5 mm thick) were degreased, and the test sample was pressure bonded to the top face of one aluminum plate at 23° C. using a 2 kg hand roller.

Next, the release liner of the test sample pressure bonded to the aluminum plate was peeled off, and the other aluminum plate having a degreased, smooth surface was overlaid on the top face of the test sample and was pressure bonded thereto at 23° C. for 10 seconds with a load of 0.5 MPa. After being left under a 23° C. environment for 5 minutes, the ends of the two aluminum plates were each chucked, and the adhesive strength of the thermally expandable thermosetting adhesive layer in a shear direction when a tensile test was performed at 10 mm/minute in a 180° direction using a Tensilon tensile testing machine [manufactured by A & D Company, Limited, model: RTM-100] was measured.

(Evaluation 2-2: Measurement of Shear Adhesive Strength on First Face and Second Face of Adhesive Sheet Before Heating)

The adhesive sheets of the examples and the comparative examples were cut into a size of 10 mm×10 mm, which were used as test samples. Two smooth-surfaced aluminum plates (15 mm wide×70 mm long×0.5 mm thick) were degreased, and a strong adhesive for test sample fixation (Metal Lock, a two-component mixing, room temperature curing type acrylic adhesive manufactured by Cemedine Co. Ltd.) was applied to the top face of one aluminum plate. The release liner on the second face (the second face of the adhesive sheet) side of the test sample was peeled off, the second face of the test sample was overlaid on the one aluminum plate through the strong adhesive, and the sample was pressure bonded thereto at 23° C. using a 2 kg hand roller. Next, the release liner on the first face side of the test sample pressure bonded to the aluminum plate was peeled off, and the other aluminum plate having a degreased, smooth surface was overlaid on the top face of the test sample (the second face of the adhesive sheet) and was pressure bonded thereto at 23° C. for 10 seconds with a load of 0.5 MPa. After being left under a 23° C. environment for 5 minutes, the ends of the two aluminum plates were each chucked, and an adhesive strength in a shear direction when a tensile test was performed at 10 mm/minute in a 180° direction using a Tensilon tensile testing machine [manufactured by A & D Company, Limited, model: RTM-100] was measured. The adhesive strength at this time was defined as the shear adhesive strength of the first face of the adhesive sheet.

An adhesive strength in a shear direction was measured in the same manner as in the above method of measurement except that the first face of the test sample (the first face of the adhesive sheet) with the release liner peeled off and one aluminum plate were pressure bonded together through the strong adhesive, while the other aluminum plate and the second face of the test sample (the second face of the adhesive sheet) were pressure bonded together. The adhesive strength at this time was defined as the shear adhesive strength of the second face of the adhesive sheet.

[Evaluation 3: Evaluation of Temporary Fixability to Member]

The adhesive sheets obtained in the examples and the comparative examples were cut into a size of 15 mm×15 mm, which were used as test samples. Next, the above test sample, from which the release liner on the first face side of the adhesive sheet was peeled off, was overlaid on the center of a degreased, smooth SUS plate (40 mm wide×50 mm long×3 mm thick) and was pressure bonded thereto at 23° C. for 10 seconds with a load of 0.5 MPa to fix the test sample.

Subsequently, the SUS plate was erected so as to be 90° with respect to the floor under 23° C., and the SUS plate was lifted so as to position the test sample bonded to the SUS plate at a height of 15 cm from the floor and was vertically dropped. This operation was repeated 10 times. Subsequently, the amount of deviation caused by the dropping of the fixed test sample was measured, and the temporary fixability to the member was evaluated in accordance with the following criteria.

39 40

(Criteria)

◎: The amount of deviation of the test sample was 0 mm.

○: The amount of deviation of the test sample was less than 1 mm.

Δ: The amount of deviation of the test sample was 1 mm or more.

X: The test sample peeled off from the SUS plate.

[Evaluation 4: Method for Evaluating Insertability into Member]

The adhesive sheets obtained in the examples and the comparative examples were cut into a size of 15 mm×15 mm. Next, the adhesive sheet, from which the release liner on the face on the first face side was peeled off, was overlaid on the center of one face of a degreased, smooth SUS plate (30 mm wide×30 mm long×1 mm thick) and was pressure bonded thereto at 23° C. for 10 seconds with a load of 0.5 MPa to fix the adhesive sheet. Subsequently, the release liner on the second face side of the adhesive sheet fixed to the SUS plate was removed, which was used as a test sample.

Next, two smooth glass plates (70 mm wide×50 mm long×1.5 mm thick) were prepared, and two spacers (5 mm wide×50 mm long) were placed on one glass plate (C1) in parallel with a 60 mm spacing and were bonded thereto. Subsequently, the other glass plate (C2) was overlaid on the spacers to be bonded to the spacers to produce a cavity formed by two pieces of glass and two spacers.

Subsequently, the test sample was erected so as to be 90° with respect to the floor, was inserted vertically into the cavity formed by two pieces of glass and two spacers, and was passed therethrough. The thickness of the spacers allowing the test sample to pass without adhering to the glass was measured, and the insertability of the test sample to the member was evaluated in accordance with the following determination.

(Criteria)

◎: The test sample was able to pass even when the thickness of the spacers was increased by 50 μm with respect to the total thickness of the adhesive sheet and the SUS plate.

○: The test sample could not pass when the thickness of the spacers was increased by 50 μm with respect to the total thickness of the adhesive sheet and the SUS plate but was able to pass when the thickness was increased by 75 μm.

Δ: The test sample could not pass when the thickness of the spacers was increased by 75 μm with respect to the total thickness of the adhesive sheet and the SUS plate but was able to pass when the thickness was increased by 100 μm.

X: The test sample could not pass even when the thickness of the spacers was increased by 100 μm with respect to the total thickness of the adhesive sheet and the SUS plate.

[Evaluation 5: Method for Measuring Shear Adhesive Strength of Adhesive Sheet after Heating (after Expansion)]

Figure 5:
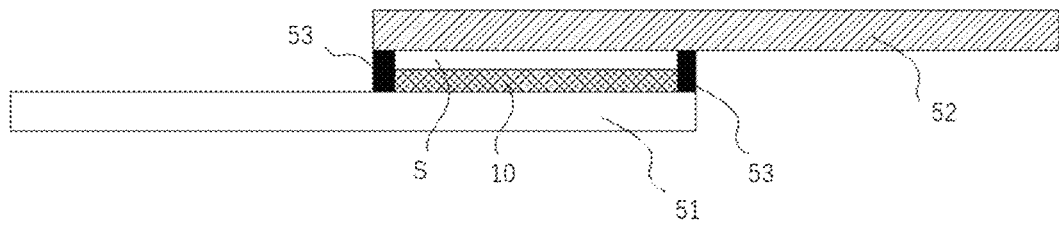
FIG. 5 is a schematic diagram of a method of measuring the shear adhesive strength of the adhesive sheet after heating (after expansion).

Two smooth-surfaced aluminum plates 51 and 52 (15 mm wide×70 mm long×0.5 mm thick) were degreased, and two spacers 53 (5 mm wide) were placed on the ends of the top face of one aluminum plate 51 in parallel with a 12 mm spacing and were bonded thereto as in FIG. 5. The spacers 53 that were prepared in such a manner that the total thickness of the spacers 53 and the adhesive tape used for bonding was larger than the total thickness of the adhesive sheet by 150 μm were used. Next, the adhesive sheet 10 obtained in the examples and the comparative examples cut into a size of 10 mm×10 mm in advance, from which the release liner on the face of the adhesive sheet 10 on the first face side was peeled off, was bonded to a cavity S on the top face side of the aluminum plate 51 and between the two spacers 53 and was pressure bonded thereto using a 2 kg hand roller.

Next, the release liner on the second face side of the adhesive sheet 10 was peeled off, and the other aluminum plate 52 (15 mm wide×70 mm long×0.5 mm thick) having a degreased, smooth surface was placed on the top face (the second face) of the adhesive sheet, and these were fixed to each other with a clip. The above fixed object was heated at 150° C. for 60 minutes and was then left under a 23° C. environment for 30 minutes to be cooled. Next, with the object from which the clip was removed as a test sample, the ends of the two aluminum plates 51 and 52 were each chucked, and adhesive strengths in a shear direction when a tensile test was performed at 10 mm/minute in a 180° direction at 23° C. and 150° C. using a Tensilon tensile testing machine [manufactured by A & D Company, Limited, model: RTM-100] were each measured.

The tables below list the evaluation results.

TABLE 1

| | | | Example 1 | Example 2 | Example 3 | Example 4 |
|---|---|---|---|---|---|---|
| Configuration of adhesive sheet | Thermally expandable thermosetting adhesive layer A (First face of sheet) | Adhesive type | (a-1) | (a-1) | (a-2) | (a-1) |
| | | Thickness [μm] | 62 | 62 | 62 | 75 |
| | | Expansion rate [%] | 450 | 450 | 483 | 446 |
| | | Shear adhesive strength before heating [MPa] | 1.1 | 1.1 | 0.8 | 1.0 |
| | Base | Type | PI | PI | PI | — |
| | | Thickness [μm] | 25 | 25 | 25 | — |
| | Thermally expandable thermosetting adhesive | Adhesive type | (b-1) | (b-2) | (b-3) | (b-1) |
| | | Thickness [μm] | 62 | 62 | 62 | 75 |

TABLE 1-continued

| | | Example 1 | Example 2 | Example 3 | Example 4 |
|---|---|---|---|---|---|
| layer B (Second face of sheet) | Expansion rate [%] | 392 | 410 | 430 | 396 |
| | Shear adhesive strength before heating [MPa] | 0.05 | 0.1 | 0.06 | 0.05 |
| Total thickness of adhesive sheet [μm] | | 149 | 149 | 149 | 150 |
| Shear adhesive strength of first face of adhesive sheet before heating [MPa] | | 1.0 | 1.0 | 0.9 | 0.9 |
| Shear adhesive strength of second face of adhesive sheet before heating [MPa] | | 0.05 | 0.1 | 0.05 | 0.05 |
| Temporary fixability to member | | ◎ | ◎ | ◎ | ◎ |
| Insertability into member | | ◎ | ○ | ◎ | ◎ |
| Shear adhesive strength of adhesive sheet after heating (after expansion) [MPa] | 23° C. | 6.8 | 8.2 | 7.5 | 6.1 |
| | Under 150° C. heating | 4.3 | 5.6 | 5.2 | 4.0 |

TABLE 2

| | | | Comparative Example 1 | Comparative Example 2 | Comparative Example 3 |
|---|---|---|---|---|---|
| Configuration of adhesive sheet | Thermally expandable thermosetting adhesive layer A (First face of sheet) | Adhesive type | (a-1) | (b-1) | (a-1) |
| | | Thickness [μm] | 62 | 62 | 62 |
| | | Expansion rate [%] | 450 | 392 | 450 |
| | | Shear adhesive strength before heating [MPa] | 1.1 | 0.2 | 1.1 |
| | Base | Type | PI | PI | PI |
| | | Thickness [μm] | 25 | 25 | 25 |
| | Thermally expandable thermosetting adhesive layer B (Second face of sheet) | Adhesive type | (a-1) | (b-1) | (b'-1) *Non-expandable |
| | | Thickness [μm] | 62 | 62 | 62 |
| | | Expansion rate [%] | 450 | 392 | 102 |
| | | Shear adhesive strength before heating [MPa] | 1.1 | 0.2 | 0.1 |
| Total thickness of adhesive sheet [μm] | | | 149 | 149 | 149 |
| Shear adhesive strength of first face of adhesive sheet before heating [MPa] | | | 1.0 | 0.1 | 1.1 |
| Shear adhesive strength of second face of adhesive sheet before heating [MPa] | | | 1.1 | 0.1 | 0.1 |
| Temporary fixability to member | | | ◎ | X | ◎ |
| Insertability into member | | | X | ◎ | ◎ |
| Shear adhesive strength of adhesive sheet after heating (after expansion) [MPa] | 23° C. | | 6.1 | 6.9 | 2.5 |
| | Under 150° C. heating | | 4.4 | 3.8 | 1.2 |

The adhesive sheets of Examples 1 to 4 showed good temporary fixability and insertability to the member and showed high shear adhesive strength after heat expansion under the room temperature and high temperature environments. On the other hand, in the adhesive sheet of Comparative Example 1, the shear adhesive strength of the first face of the adhesive sheet was lower than the shear adhesive strength of the second face before heating, and insertability could not be obtained. In the adhesive sheet of Comparative Example 2, both the first face and the second face of the adhesive sheet had the same shear adhesive strength before heating, and temporary fixability could not be obtained. The adhesive sheet of Comparative Example 3 was inferior to the adhesive sheets in the examples in the shear adhesive strengths under the room temperature and high temperature environments after heat expansion, and especially the shear adhesive strength under the high temperature environment could not be obtained. It is presumed that this is because the thermosetting adhesive layer (B'-1) of the adhesive sheet of Comparative Example 3 did not expand by heating, thus could not sufficiently fill the cavity between the two adherends, and could not sufficiently intimately adhere to the other adherend. In the adhesive sheet of Comparative Example 3, only the thermally expandable thermosetting adhesive layer (A-1) was expanded to achieve intimate contact, and it is presumed that the expansion rate of the thermally expandable thermosetting adhesive layer (A-1) in Comparative Example 3 is larger than the others in a limited space like that illustrated in FIG. 5. Thus, it is presumed that in the adhesive sheet of Comparative Example 3 after heating (after expansion), the density of the thermally expandable thermosetting adhesive layer (A-1) became sparse, and consequently, it could not develop and maintain sufficient adhesive strength after heating.

REFERENCE SIGNS LIST 1 thermally expandable thermosetting adhesive layer A
1' thermally expandable thermosetting adhesive layer A after expansion (expanded product of thermally expandable thermosetting adhesive layer A)
2 thermally expandable thermosetting adhesive layer B
2' thermally expandable thermosetting adhesive layer B after expansion (expanded product of thermally expandable thermosetting adhesive layer B)
3 intermediate layer
10 adhesive sheet
10' adhesive sheet after expansion (expanded product of adhesive sheet)
20 article Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:

1. An adhesive sheet comprising:
a first face; and
a second face,
wherein:
the first face and the second face are opposite to each other,
the first face includes a thermally expandable thermosetting adhesive layer A containing a thermosetting resin and an expansion agent,
the second face includes a thermally expandable thermosetting adhesive layer B containing a thermosetting resin and an expansion agent and having a different composition from a composition of the thermally expandable thermosetting adhesive layer A,
the thermally expandable thermosetting adhesive layer B is laminated on one face of the thermally expandable thermosetting adhesive layer A directly or through another layer,
the first face has a higher shear adhesive strength than a shear adhesive strength of the second face,
the thermally expandable thermosetting adhesive layer A and the thermally expandable thermosetting adhesive layer B each have a thickness direction expansion rate of 130% or more after heating at 150° C. for 60 minutes, and
the shear adhesive strength of the second face of the adhesive sheet before thermal expansion is less than 0.5 MPa.

2. The adhesive sheet according to claim 1, wherein the shear adhesive strength of the first face of the adhesive sheet is 0.2 MPa or more.

3. The adhesive sheet according to claim 1, wherein the thermally expandable thermosetting adhesive layer A contains a thermosetting resin with a viscosity of 3,000,000 mPa·sec or less at 25° C. in an amount of 10% by mass or more in an entire resin component of the thermally expandable thermosetting adhesive layer A.

4. The adhesive sheet according to claim 3, wherein the thermally expandable thermosetting adhesive layer A contains a thermosetting resin with a viscosity of 3,000,000 mPa·sec or less at 25° C. in an amount of 10% by mass or more and 50% by mass or less in an entire resin component of the thermally expandable thermosetting adhesive layer A.

5. The adhesive sheet according to claim 1, wherein the thermally expandable thermosetting adhesive layer B contains a thermosetting resin with a viscosity of 3,000,000 mPa·sec or less at 25° C. in an amount of 40% by mass or less in an entire resin component of the thermally expandable thermosetting adhesive layer B.

6. The adhesive sheet according to claim 5, wherein the thermally expandable thermosetting adhesive layer B contains a thermosetting resin with a viscosity of 3,000,000 mPa·sec or less at 25° C. in an amount of 20% by mass or less in an entire resin component of the thermally expandable thermosetting adhesive layer B.

7. The adhesive sheet according to claim 1, wherein the thermally expandable thermosetting adhesive layer A and the thermally expandable thermosetting adhesive layer B each have a glass transition temperature of 80° C. or higher after heating at 150° C. for 60 minutes.

8. An article comprising:
a first adherend; and
a second adherend that is formed with a cavity,
wherein:
the first adherend is disposed in the cavity of the second adherend,
an expanded product of the adhesive sheet according to claim 1 is disposed between the first adherend and the second adherend in the cavity, and
one of the first adherend and the second adherend is bonded to the thermally expandable thermosetting adhesive layer A after expansion and an other of the first adherend and the second adherend is bonded to the thermally expandable thermosetting adhesive layer B after expansion.

9. An article comprising:
a first adherend;
a third adherend;
a fourth adherend; and
a cavity between the third adherend and the fourth adherend,
wherein
the first adherend is disposed in the cavity, and
an expanded product of the adhesive sheet according to claim 1 is disposed between the first adherend and the third adherend and between the first adherend and the fourth adherend in the cavity respectively, and
at least one of the first adherend, and the third adherend and the fourth adherend is bonded to the thermally expandable thermosetting adhesive layer A after expansion and another of the first adherend, and the third adherend and the fourth adherend is bonded to the thermally expandable thermosetting adhesive layer B after expansion.

10. A method for producing an article, the method comprising:
a step 1A of bonding a face of the thermally expandable thermosetting adhesive layer A side of the adhesive sheet according to claim 1 to a surface of a first adherend or a surface of a cavity formed in a second adherend;

a step 2A of inserting the first adherend into the cavity; and a step 3A of heating the adhesive sheet to expand and cure the thermally expandable thermosetting adhesive layer A and the thermally expandable thermosetting adhesive layer B and to bond the first adherend and the second adherend together through an expanded product of the adhesive sheet.

11. A method for producing an article, the method comprising:

a step 1B of bonding a face of a thermally expandable thermosetting adhesive layer A side of the adhesive sheet according to claim 1 to a surface of a first adherend or a surface of a cavity formed by a third adherend and a fourth adherend;

a step 2B of inserting the first adherend into the cavity; and a step 3B of heating the adhesive sheet to expand and cure a thermally expandable thermosetting adhesive layer A and the thermally expandable thermosetting adhesive layer B and to bond the first adherend with the third adherend and the fourth adherend together through an expanded product of the adhesive sheet.

* * * * *